(12) United States Patent
Foukas et al.

(10) Patent No.: US 12,556,992 B2
(45) Date of Patent: Feb. 17, 2026

(54) 5G RADIO ACCESS NETWORK LIVE MIGRATION AND SHARING

(71) Applicant: Microsoft Technology Licensing, LLC, Redmond, WA (US)

(72) Inventors: Xenofon Foukas, Cambridge (GB); Daehyeok Kim, Redmond, WA (US); Anuj Kalia, San Francisco, CA (US); Manikanta Kotaru, Kenmore, WA (US); Jiarong Xing, Houston, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 456 days.

(21) Appl. No.: 18/326,600

(22) Filed: May 31, 2023

(65) Prior Publication Data

US 2024/0292300 A1 Aug. 29, 2024

Related U.S. Application Data

(60) Provisional application No. 63/448,062, filed on Feb. 24, 2023.

(51) Int. Cl.
*H04W 36/12* (2009.01)
*H04W 36/00* (2009.01)

(52) U.S. Cl.
CPC ....... *H04W 36/12* (2013.01); *H04W 36/0009* (2018.08)

(58) Field of Classification Search
CPC ............. H04W 36/0009; H04W 36/12
See application file for complete search history.

(56) References Cited

U.S. PATENT DOCUMENTS

2017/0353903 A1 12/2017 Rost

FOREIGN PATENT DOCUMENTS

| WO | 2022147424 A1 | 7/2022 |
| WO | 2023244360 A1 | 12/2023 |

OTHER PUBLICATIONS

X. Wang, L. Wang, C. Cavdar, M. Tornatore, G. Figueiredo, H. Chung, H. Lee, S. Park, and B. Mukherjee, "Handover Reduction in Virtualized Cloud Radio Access Networks Using TWDM-PON Fronthaul," J. Opt. Commun. Netw. 8, B124-B134 (2016). (Year: 2016).*
C. C. Zhang, K. K. Nguyen and M. Cheriet, "Routing and Packet Scheduling For Virtualized Disaggregate Functions in 5G O-RAN Fronthaul," 2021 IEEE Global Communications Conference (GLOBECOM), Madrid, Spain, 2021, pp. 1-6, doi: 10.1109/GLOBECOM46510.2021.9685802. (Year: 2021).*
International Preliminary Report on Patentability received for PCT Application No. PCT/US2024/016337, Sep. 4, 2025, 09 pages.

(Continued)

*Primary Examiner* — James P Duffy
(74) *Attorney, Agent, or Firm* — ArentFox Schiff LLP

(57) ABSTRACT

A fifth generation (5G) mobile network radio access network (RAN) is virtualized for operations on edge computing platforms in a cloud-computing environment in which radio units (RUs) and radio frequency (RF) spectrum are shared among distributed units (DUs) to support use cases including: 1) live migration in which a DU is moved from one computing server to another without disruption to network traffic, and 2) RAN sharing in which two DUs share the same RU and spectrum.

20 Claims, 29 Drawing Sheets

(56) References Cited

OTHER PUBLICATIONS

International Search Report and Written Opinion received for PCT Application No. PCT/US2024/016337, Jun. 21, 2024, 15 pages.
Thiruvasagam, et al., "Open RAN: Evolution of architecture, deployment aspects, and future directions," arXiv preprint arXiv:2301.06713, Jan. 17, 2023, pp. 1-28.
"Application as Filed in U.S. Appl. No. 17/841,325", filed Jun. 15, 2022, 29 Pages.
Foukas, et al., "Taking 5G RAN Analytics and Control to a New Level", Retrieved From: https://www.microsoft.com/en-us/research/uploads/prod/2022/12/JanusTechnicalReport.pdf, Dec. 2022, 18 Pages.
Khalidi, Yousef, "Microsoft Innovation in RAN Analytics and Control", Retrieved From: https://azure.microsoft.com/en-gb/blog/microsoft-innovation-in-ran-analytics-and-control/, Dec. 21, 2022, 7 Pages.

* cited by examiner

400

500

| $\mu$ | $N^{slot}_{symb}$ | $N^{subframe, \mu}_{slot}$ | $N^{subframe, \mu}_{symb}$ |
|---|---|---|---|
| 0 | 14 | 1 | 14 |
| 1 | 14 | 2 | 28 |
| 2 | 14 | 4 | 56 |
| 3 | 14 | 8 | 112 |
| 4 | 14 | 16 | 224 |

Number of slots per subframe

ETSI TS 103 859: UE channel information frame format (Section Type "6")

| 0 (msb) | 1 | 2 | 3 | 4 | 5 | 6 | 7 (lsb) | # of bytes | |
|---|---|---|---|---|---|---|---|---|---|
| | Section Type 6: channel information conveyance | | | | | | | | |
| colspan="8" | transport header, see clause 5.1.3 | | | | | | | 8 | Octet 1 |
| colspan="2" | dataDirection | colspan="2" | payloadVersion | colspan="4" | filterIndex | | | | 1 | Octet 9 |
| colspan="8" | frameId | | | | | | | 1 | Octet 10 |
| colspan="4" | subframeId | colspan="4" | slotId | | | | | 1 | Octet 11 |
| colspan="2" | slotId | colspan="6" | startSymbolId | | | | | 1 | Octet 12 |
| colspan="8" | numberOfsections | | | | | | | 1 | Octet 13 |
| colspan="8" | sectionType = 6 | | | | | | | 1 | Octet 14 |
| colspan="8" | numberOfUEs | | | | | | | 1 | Octet 15 |
| colspan="8" | ciCompHdr | | | | | | | 1 | Octet 16 |
| ef | colspan="7" | ueId[14:8] | | | | | | | 1 | Octet 17 |
| colspan="8" | ueId[7:0] | | | | | | | 1 | Octet 18 |
| colspan="8" | regularizationFactor | | | | | | | 2 | Octet 19 |
| colspan="4" | reserved | rb | symInc | colspan="2" | startPrbc | | | 1 | Octet 21 |
| colspan="8" | startPrbc | | | | | | | 1 | Octet 22 |
| colspan="8" | numPrbc | | | | | | | 1 | Octet 23 |
| colspan="8" | ciCompParam (for the first PRB or all PRBs of the first UE, not always present) | | | | | | | var | Octet 24 |
| colspan="8" | ciIsample (first PRB, first antenna) | | | | | | | var | |
| colspan="8" | ciQsample (first PRB, first antenna) | | | | | | | var | |
| colspan="8" | ciIsample (first PRB, second antenna) | | | | | | | var | |
| colspan="8" | ciQsample (first PRB, second antenna) | | | | | | | var | |
| | ... | | | | | | | | |
| colspan="8" | ciIsample (first PRB, last antenna) | | | | | | | var | |
| colspan="8" | ciQsample (first PRB, last antenna) | | | | | | | var | |
| | ... | | | | | | | | |
| colspan="8" | ciCompParam (for the last PRB, not always present) | | | | | | | var | |
| colspan="8" | ciIsample (last PRB, last antenna) | | | | | | | var | |
| colspan="8" | ciQsample (last PRB, last antenna) | | | | | | | var | |
| colspan="8" | <padding with zeros to the next 4-byte boundary> may not be present (NOTE 2) | | | | | | | var | |
| colspan="8" | Section Extensions as indicated by "ef" | | | | | | | var | |
| | ... | | | | | | | | |
| ef | colspan="7" | ueId[14:8] | | | | | | | 1 | Octet N |
| colspan="8" | ueId[7:0] | | | | | | | 1 | N+1 |
| colspan="8" | regularizationFactor | | | | | | | 2 | N+2 |
| colspan="4" | Reserved | rb | symInc | colspan="2" | startPrbc | | | 1 | N+4 |
| colspan="8" | startPrbc | | | | | | | 1 | N+5 |
| colspan="8" | numPrbc | | | | | | | 1 | N+6 |
| colspan="8" | ciCompParam (for the first PRB or all PRBs of the last UE, not always present) | | | | | | | var | N+7 |
| colspan="8" | ciIsample (first PRB, first antenna) | | | | | | | var | |
| colspan="8" | ciQsample (first PRB, first antenna) | | | | | | | var | |
| colspan="8" | ciIsample (first PRB, second antenna) | | | | | | | var | |
| colspan="8" | ciQsample (first PRB, second antenna) | | | | | | | var | |
| | ... | | | | | | | | |
| colspan="8" | ciIsample (first PRB, last antenna) | | | | | | | var | |
| colspan="8" | ciQsample (first PRB, last antenna) | | | | | | | var | |
| | ... | | | | | | | | |
| | ciCompParam (for the last PRB, not always present) | | | | | | | | |
| colspan="8" | ciIsample (last PRB, last antenna) | | | | | | | var | |
| colspan="8" | ciQsample (last PRB, last antenna) | | | | | | | var | |
| colspan="8" | <padding with zeros to the next 4-byte boundary> may not be present (NOTE 2) | | | | | | | var | |
| colspan="8" | Section Extensions as indicated by "ef" | | | | | | | var | |

NOTE 1: shading: yellow is transport header, pink is radio application header, others are repeated sections.
NOTE 2: "may not be present" depends on O-RU boolean flag "st6-4byte-alignment-required".
NOTE 3: The remainder of N divided by 4 is 1 if 4-byte alignment is to be used.

1700

1800

2500

5G RADIO ACCESS NETWORK LIVE MIGRATION AND SHARING

CROSS REFERENCE TO RELATED APPLICATIONS

This application claims priority to U.S. Patent Application Ser. No. 63/448,062, filed Feb. 24, 2023, the entirety of which is hereby incorporated herein by references for all purposes.

BACKGROUND

Fifth generation (5G) mobile networks offer the ability to connect tens of billions of intelligent devices, densely deployed and generating orders of magnitude more data to be handled by the network. Consumers' expectations for 5G mobile networks are high and mobile network operators will be under real pressure from enterprise customers to move quickly, delivering 5G's low latency, dense device, and high-performance capabilities to enable near-real-time management and control of critical business operations.

SUMMARY

A 5G radio access network (RAN) is virtualized for operations on edge computing platforms in a cloud-computing environment in which radio units (RUS) and radio frequency (RF) spectrum resources are shared among distributed units (DUs) to support use cases including: 1) live migration in which a DU is moved from one computing server to another without disruption to network traffic such as disconnection of user equipment (UE) or loss of performance or network coverage, and 2) RAN sharing in which two DUs share the same RU and spectrum. RAN sharing enables, for example, different mobile operators (MOs) to share RAN resources and 5G network slicing in multi-vendor scenarios.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 6 shows an illustrative table of OFDM symbols per slot, slots per subframe, and OFDM symbols per subframe for normal cyclic prefix configuration;

FIG. 11 shows an illustrative user-plane (U-Plane) frame format as defined by ETSI TS 103 859;

Like reference numerals indicate like elements in the drawings. Elements are not drawn to scale unless otherwise indicated.

DETAILED DESCRIPTION

Acronyms utilized in the disclosure herein are defined in-line with the text and are also reproduced in the Acronym Table in the Appendix.

Figure 1:
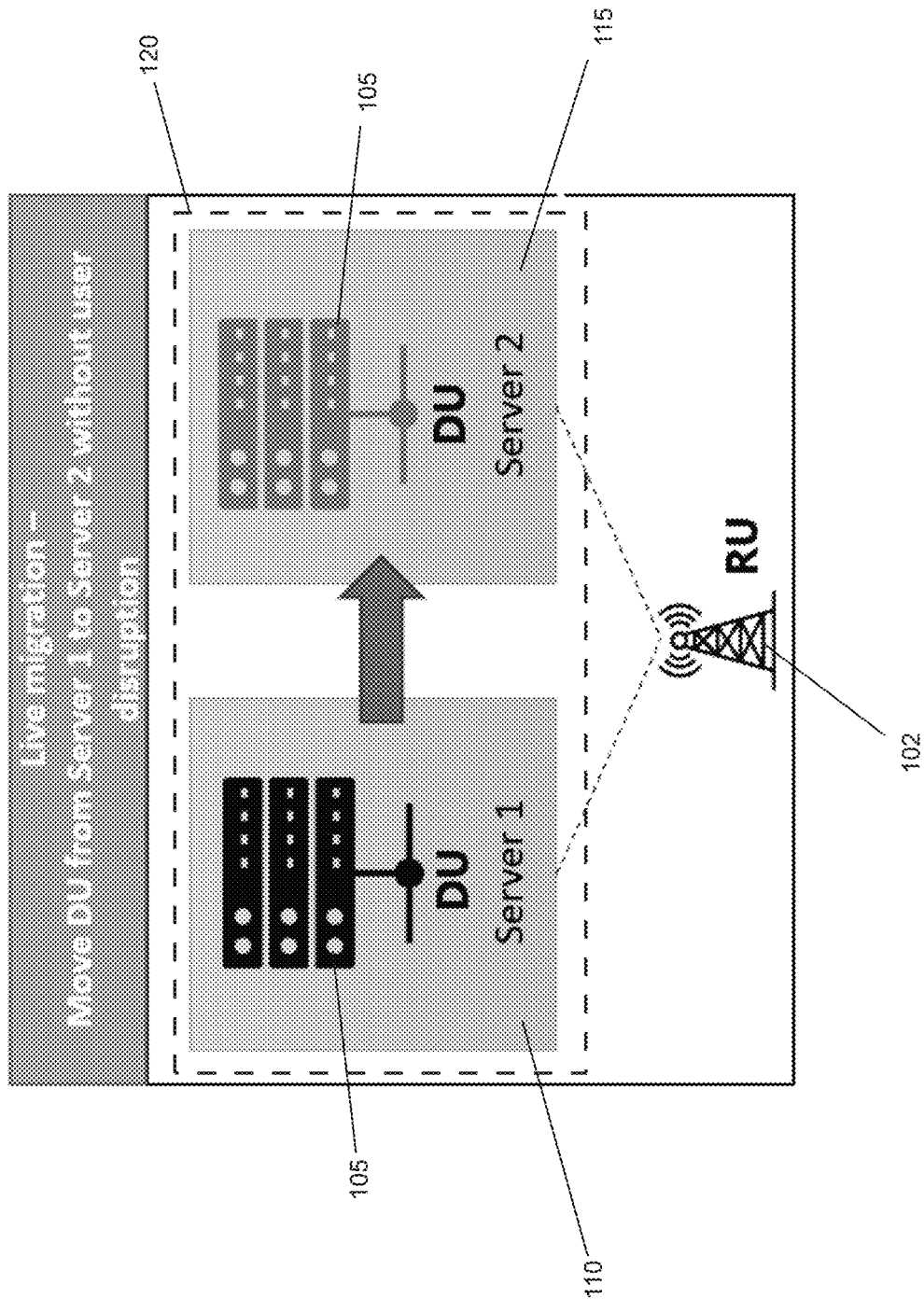
FIG. 1 shows an illustrative RAN live migration use case facilitated by the present disclosure.
Figure 2:
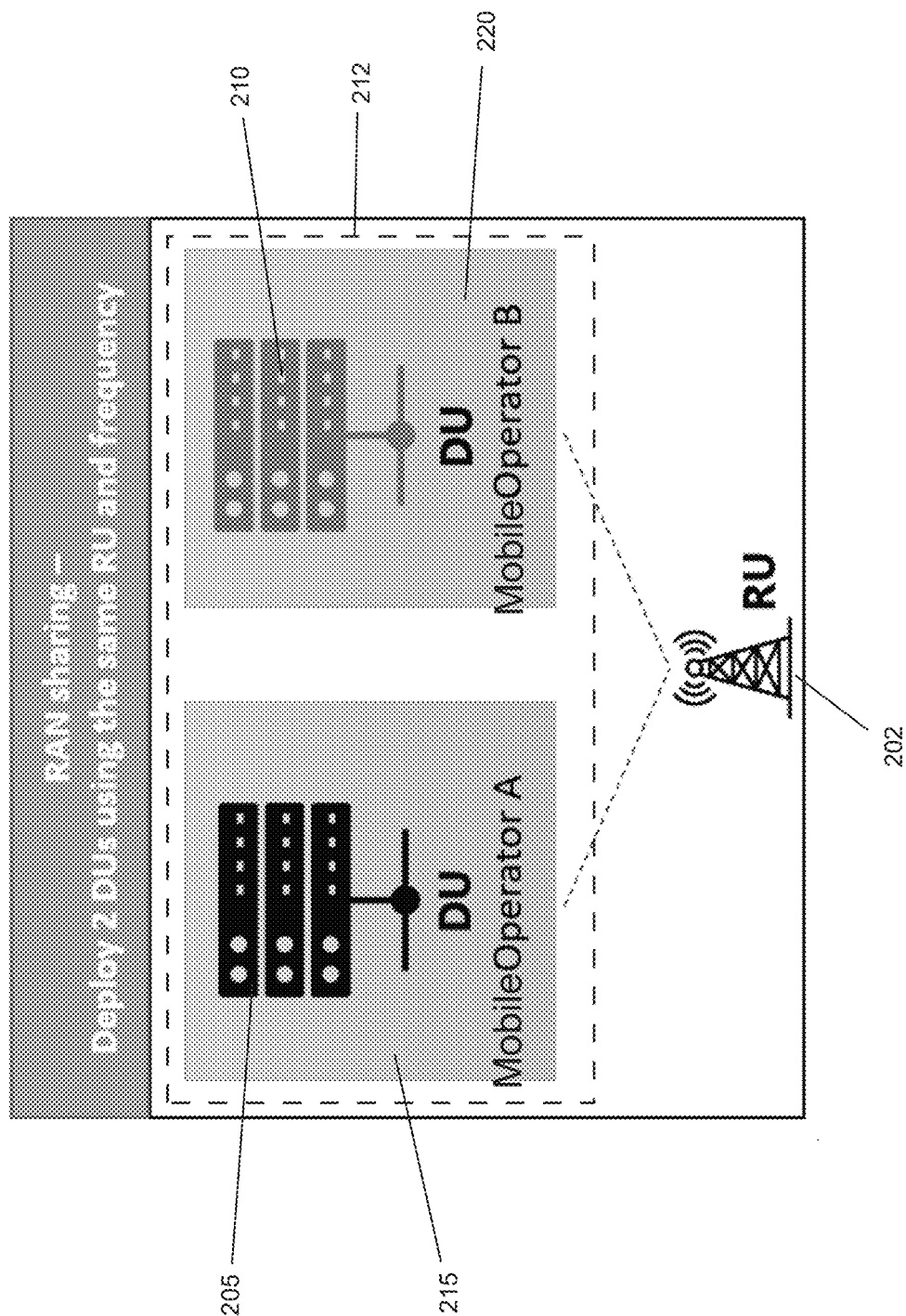
FIG. 2 shows an illustrative RAN sharing use case facilitated by the present disclosure.

RAN live migration and sharing use cases are facilitated by a virtualized RAN (radio access network) approach using edge-based cloud-computing in which 5G physical radio resources are virtualized to enable an RU (radio unit) 102 to be commonly and efficiently shared among different DUs (distributed unit) while appearing to each DU as a dedicated and isolated RU. An illustrative live migration use case example 100 is shown in FIG. 1 in which a DU 105 is moved from Server 1 (110) to Server 2 (115) in a cloud-computing data center 120 without user disruption. The servers are physically or virtually implemented to support a given application of the present principles. An illustrative RAN sharing use case example 200 is shown in FIG. 2 in which different DUs 205 and 210 are deployed in a data center 212 sharing the same RU 202 and radio spectrum. In an illustrative example, each of the DUs is associated with different mobile operators (MOs) 215 and 220. While the illustrative principles disclosed herein use the context of 5G mobile networks, it may be appreciated that they are also applicable to fourth generation long term evolution (4G LTE) networks with suitable adaptations.

Figure 3:
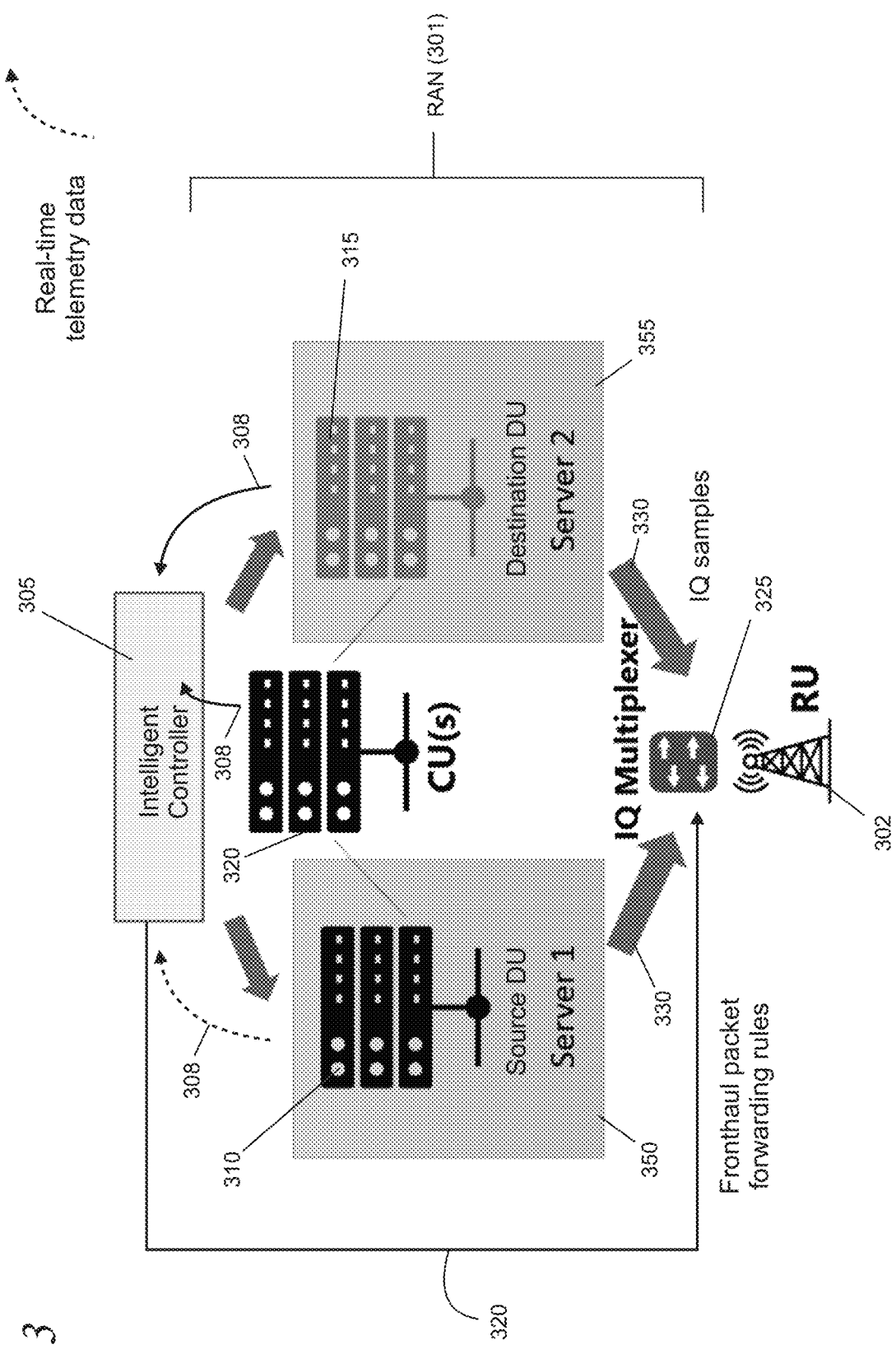
FIG. 3 shows an illustrative intelligent controller configured for operations with an IQ (in-phase and quadrature) multiplexer each of which is virtually and/or physically implementable on cloud-computing infrastructure.

RAN live migration and sharing are implemented in an illustrative use case example 300 shown in FIG. 3 in which an intelligent controller 305 is configured for real-time collection of telemetry data 308 from different RAN components 301, including source and destination DUs, as respectively indicated by reference numerals 310 and 315 and central units (CUs) 320. Telemetry data may also include UE state in some embodiments. The intelligent controller provides fronthaul packet forwarding rules 320 to an IQ (in-phase and quadrature) multiplexer 325 configured for multiplexing IQ samples 330 at a fronthaul network (not shown) between a RAN and RU 302. The intelligent controller and IQ multiplexer are virtually and/or physically implementable using cloud-computing and other infrastructure. For example, in some applications, these components are instantiated in edge and/or far-edge cloud computing platforms using suitable software, generic hardware, and/or specialized hardware such as application-specific integrated circuits (ASICs) and the like.

In an illustrative example, the intelligent controller 305 is implementable in a RAN intelligent controller (RIC), described below in the text accompanying FIGS. 24 and 25, that includes control hooks into the DUs 310 and 315. In various illustrative examples, the IQ multiplexer 325 is implementable in different ways depending on the requirements of a particular application. Implementation alternatives include a programmable switch such as a physically-embodied top of rack (TOR) switch or a software switch that is implemented virtually on various computing infrastructure. Another IQ multiplexer architecture includes switching solutions that are implemented in-line with virtualized RAN components including DUs and/or CUs, or other virtualized RAN components.

Acting through the forwarding rules 320 provided to the IQ multiplexer 325, and based on the real-time telemetry data 308, the intelligent controller dynamically allocates blocks of radio resources at the source and destination DUs to enable sharing of the common RU with minimized interference. In the live migration use case, the intelligent controller allocates radio resources so that traffic from UEs is handed over from the source DU to the destination DU with minimized UE disconnection and traffic disruption. In the RAN sharing use case, IQ samples are dynamically merged based on network loading and radio resource allocation at each DU (as determined by telemetry data), but handovers of UE traffic are not necessarily implemented.

In an illustrative example, IQ samples to and from the RU are combined at the IQ multiplexer for two DUs (e.g., a source DU 310 on server 1 (350) and a destination DU 315 on server 2 (355)) using forwarding rules 320 on fronthaul network packets carrying the samples. The use of two DUs in this example is illustrative and non-limiting and the present RAN live migration and sharing principles described herein are adaptable to use cases involving more than two DUs with suitable modifications. The fronthaul network packets include xRAN packets, as described by the open Fronthaul Specification published by the xRAN Forum, and are collected using the 7.2 split RAN protocol proposed by O-RAN Alliance which splits the physical (PHY) layer into a high-PHY and a low-PHY. The high-PHY resides in the DU and the low-PHY resides in the RU. It is emphasized that the xRAN packets and the 7.2 protocol used in this example are illustrative and non-limiting and that various other fronthaul network architectures, protocols, interfaces, and functional splits are usable to meet the requirements of a particular application of the present RAN live migration and sharing.

Figure 4:
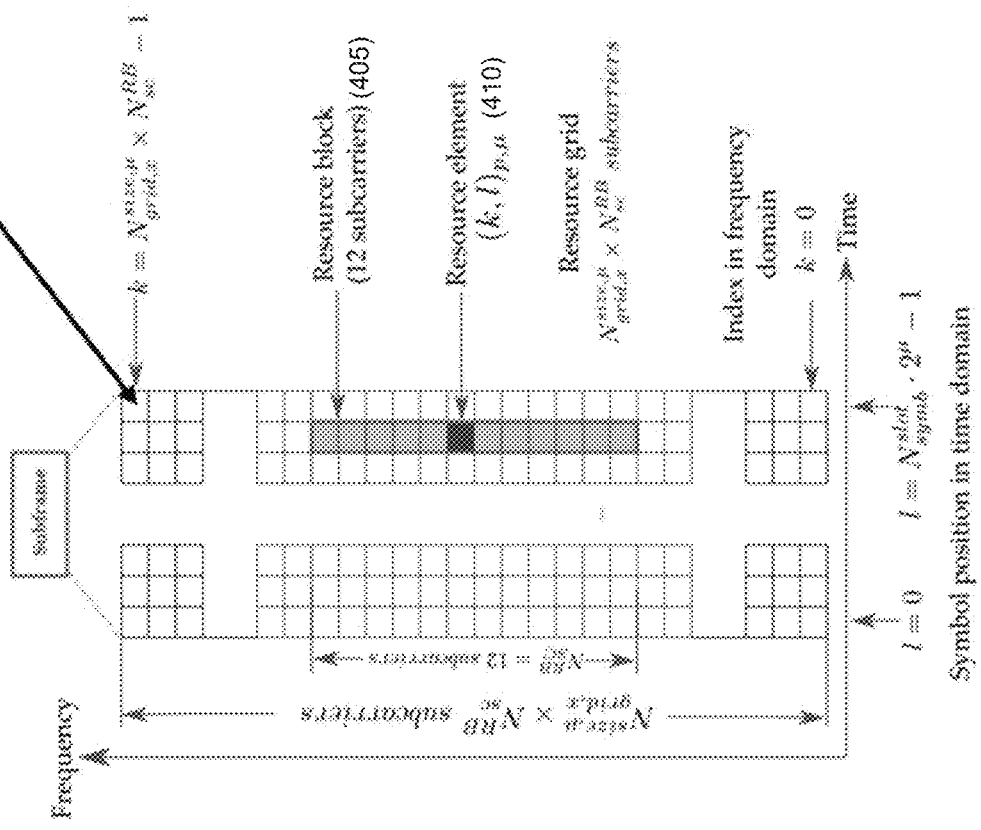
FIG. 4 shows an illustrative 5G NR (new radio) time-frequency resource grid.

IQ samples are defined in the published 5G NR (new radio) literature (See, e.g., M. Viswanathan, Gaussianwaves.com (2022)) as using a complex number as illustratively shown in graph 400 in FIG. 4 in which subcarriers in the frequency domain are plotted against symbol position in the time domain. As shown, a physical resource block 405 comprises 12 subcarriers over which transmissions are scheduled. A resource element 410 is the smallest time-frequency resource over one subcarrier of a single OFDM (orthogonal frequency division multiplexing) symbol.

Figure 5:
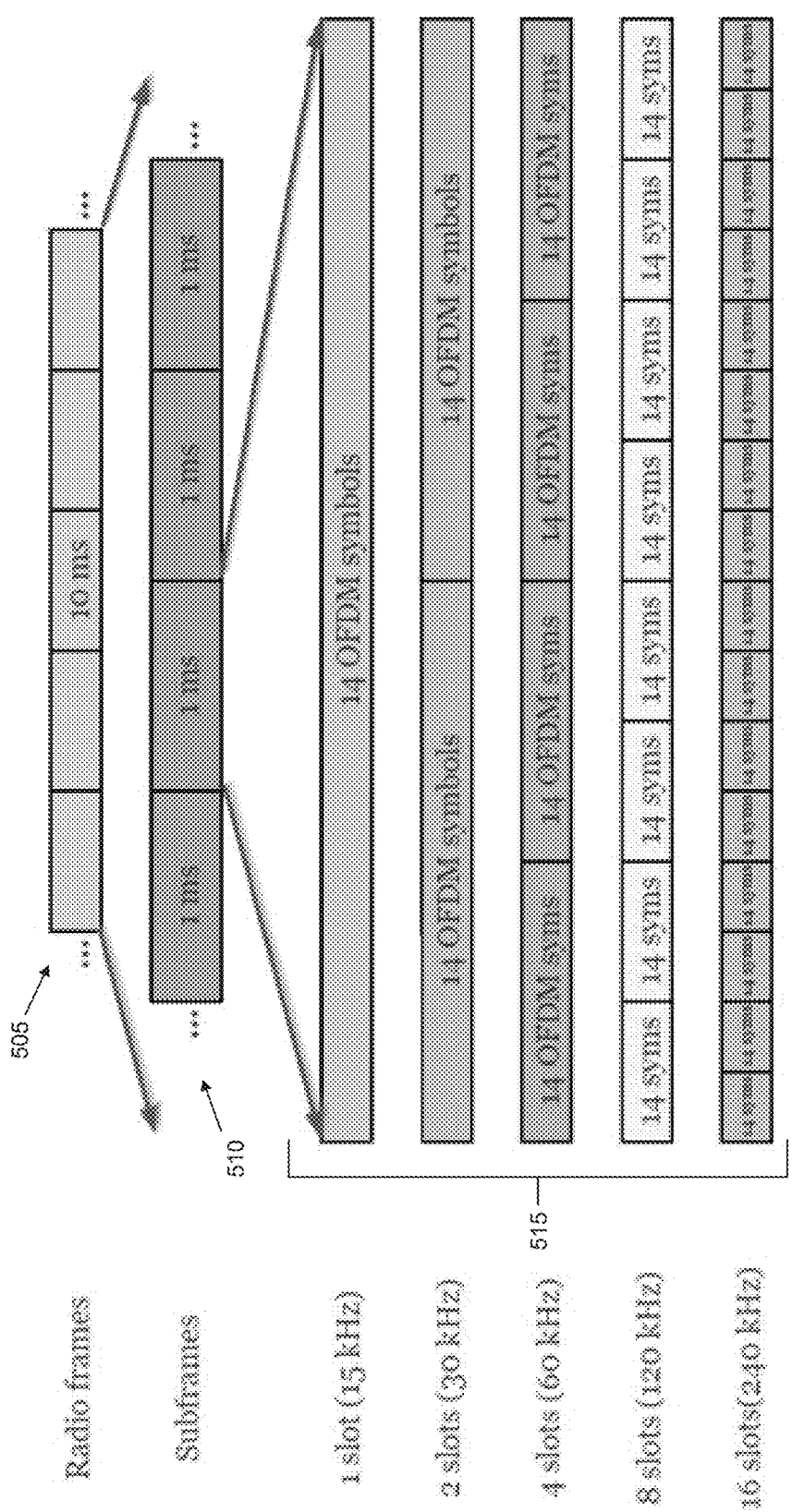
FIG. 5 shows an illustrative 5G NR frame structure.

As shown in FIG. 5, and described by Viswanathan, a 5G NR frame structure 500 from the time domain perspective comprises radio frames 505, subframes 510, and slots 515. A radio frame is for a duration of 10 ms and it comprises 10 subframes of duration 1 ms each. Each subframe may consist of one or multiple adjacent slots with each slot having 14 symbols. The possibility of transmission over a fraction of a slot is referred to as a mini-slot. FIG. 6 shows an illustrative table 600, described by Viswanathan, of OFDM symbols per slot, slots per subframe, and OFDM symbols per subframe for normal cyclic prefix configuration. The parameter $\mu$ is referred to as a numerology.

Figure 7:
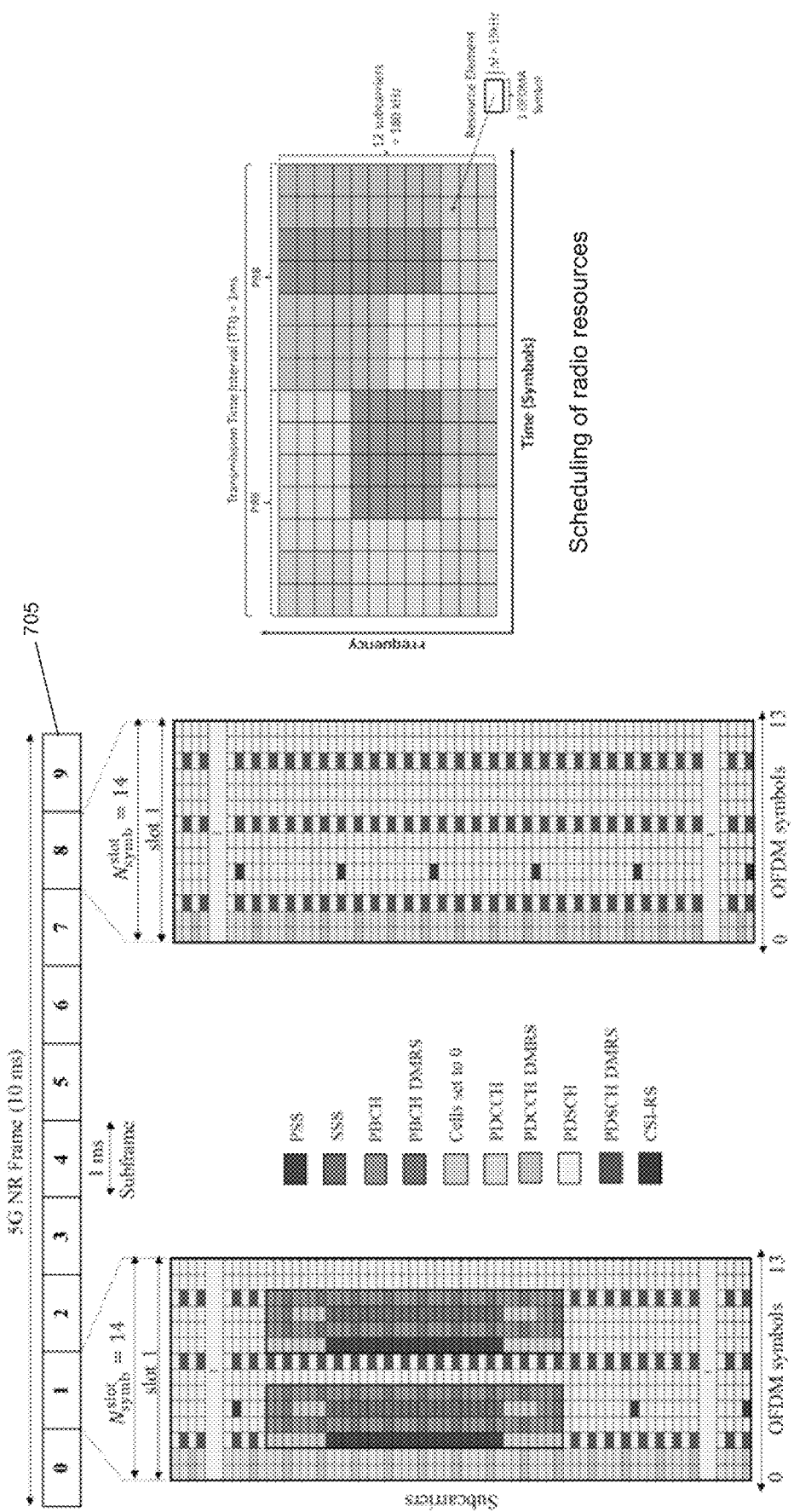
FIG. 7 shows an illustrative physical channel allocation within a 5G NR frame and associated scheduling of radio resources based on the allocated channels.

FIG. 7 shows an illustrative physical channel allocation 700 within a 5G NR frame 705 and associated scheduling of radio resources based on the allocated channels. As described by Fuentes et al. in "5G New Radio Evaluation Against IMT-2020 Key Performance Indicators" (IEEE Access, 2020), physical channels are defined as flows of information transmitted between the physical (PHY) and the medium access control (MAC) layers. By comparison, physical signals are flows of information transmitted only at the physical layer. In the DL (downlink), three physical channels are used: the Physical Broadcast Channel (PBCH) to transmit the static part of the system information, known as the Master Information Block (MIB), to all UEs requiring access to the network; the Physical Downlink Control Channel (PDCCH) to specify the data scheduling and allocation by means of Downlink Control Information (DCI) for every UE and to configure other aspects such as HARQ (hybrid automatic repeat request) retransmissions, link adaptation and MIMO (multiple input, multiple output); and the Physical Downlink Shared Channel (PDSCH) that transmits the data content to UEs. Additionally, there are four types of reference signals: Primary and Secondary Synchronization Signals (PSS, SSS), needed by UEs to access the network and, more specifically, to receive radio frame timing information and cell ID; Demodulation Reference Signals (DMRS), used for channel estimation to retrieve the data in PBCH, PDCCH and PDSCH; Phase Tracking Reference Signals (PT-RS) to estimate the phase noise in the PDSCH (only used at Frequency Range 2, FR2); and Channel State Information Reference Signals (CSI-RS), used to provide CSI needed for link adaptation. In the UL, another three physical channels are defined: Physical Random Access Channel (PRACH), used by the UE to request initial access as well as during the beam management process; the Physical Uplink Control Channel (PUCCH), which carries Uplink Control Information (UCI) and contains different information such as CSI, HARQ or scheduling requests; and the Physical Uplink Shared Channel (PUSCH), which transmits the data content to the gNB. In the case of the UL (uplink), similar reference signals are used, i.e., DMRS, PT-RS and Sounding Reference Signals (SRS), equivalent to CSI-RS in the DL.

Figure 8:
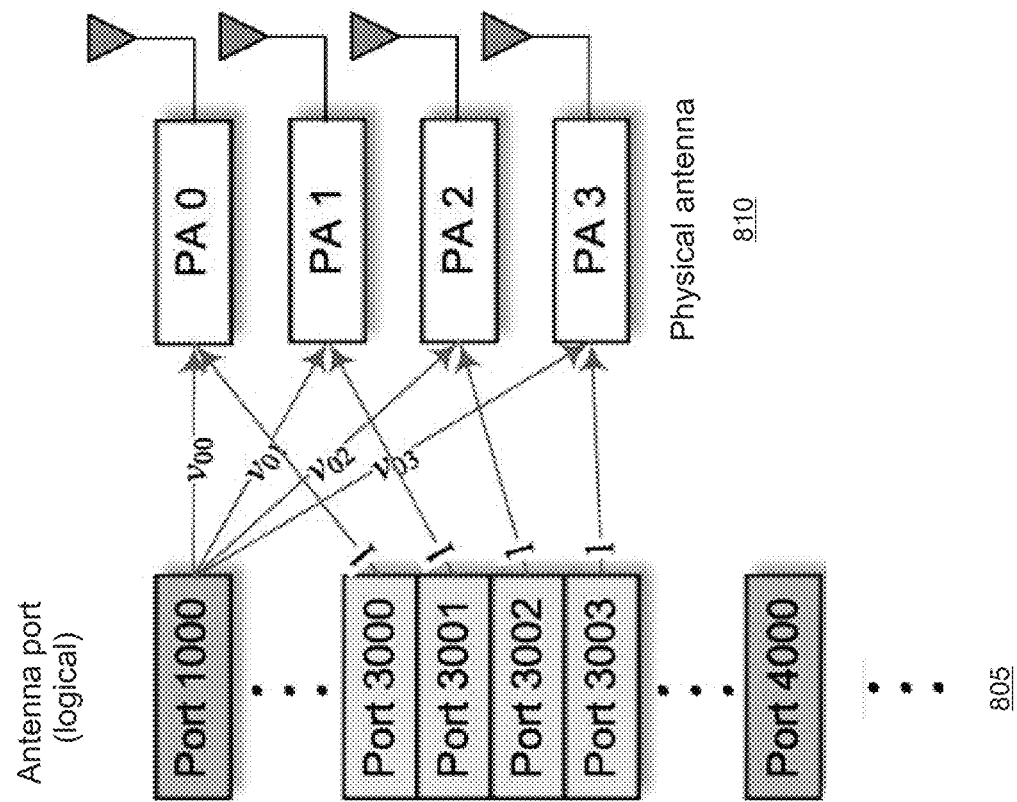
FIG. 8 shows illustrative mapping of physical channels to physical antenna ports.

FIG. 8 shows illustrative mapping 800 of physical channels 805 to physical antenna ports 810 as described by N. H. Trung "Multiplexing Techniques for Applications Based on 5G Systems" (2022). Recognizing that signals transmitted from different logical antenna ports will experience different radio conditions, the present RAN live migration and sharing implements antenna port mapping. The mapping of DU data flows to antenna ports is done through the use of RU endpoint identifiers. For example, in the context of the O-RAN 7.2 protocol, as described in Section 5.1.3.2.7 of O-RAN Technical Specification WG4.CUS.0-v10.00, this mapping is done with eAxC identifiers (eAxC_ID), located in the header of the xRAN packet. Each eAxC_ID could thus correspond to one or more spatial streams of the DU and be mapped to one or more RU antennas.

In present mapping scheme, SSB and PDCCH are always mapped to a single physical antenna port, while PDSCH may be mapped to many antenna ports. In addition, some signals must be transmitted from the same antennas, for example, PDSCH and DMRS.

Figure 9:
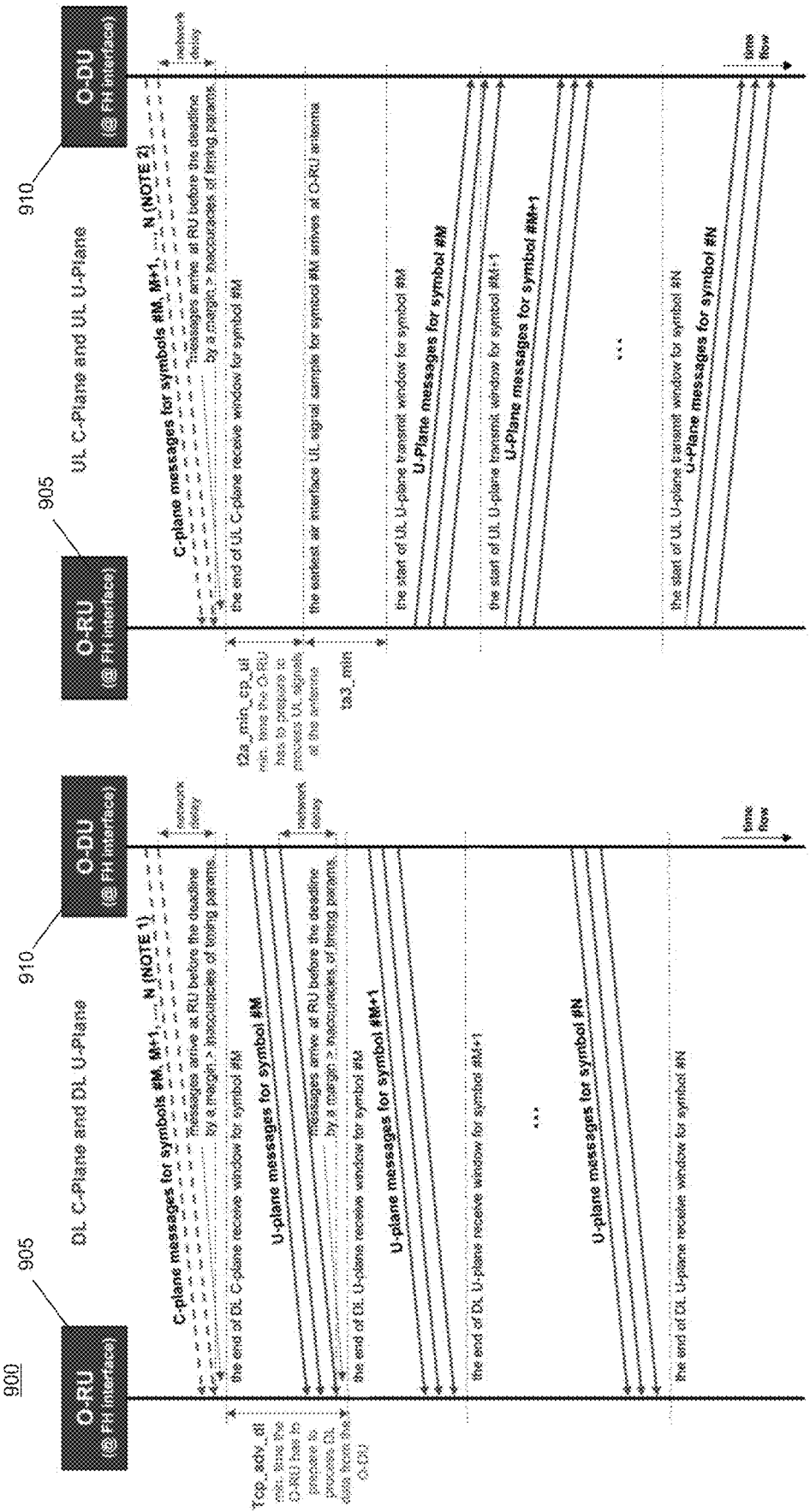
FIG. 9 shows an illustrative message exchange in accordance with the xRAN 7.2x protocol.
Figure 10:
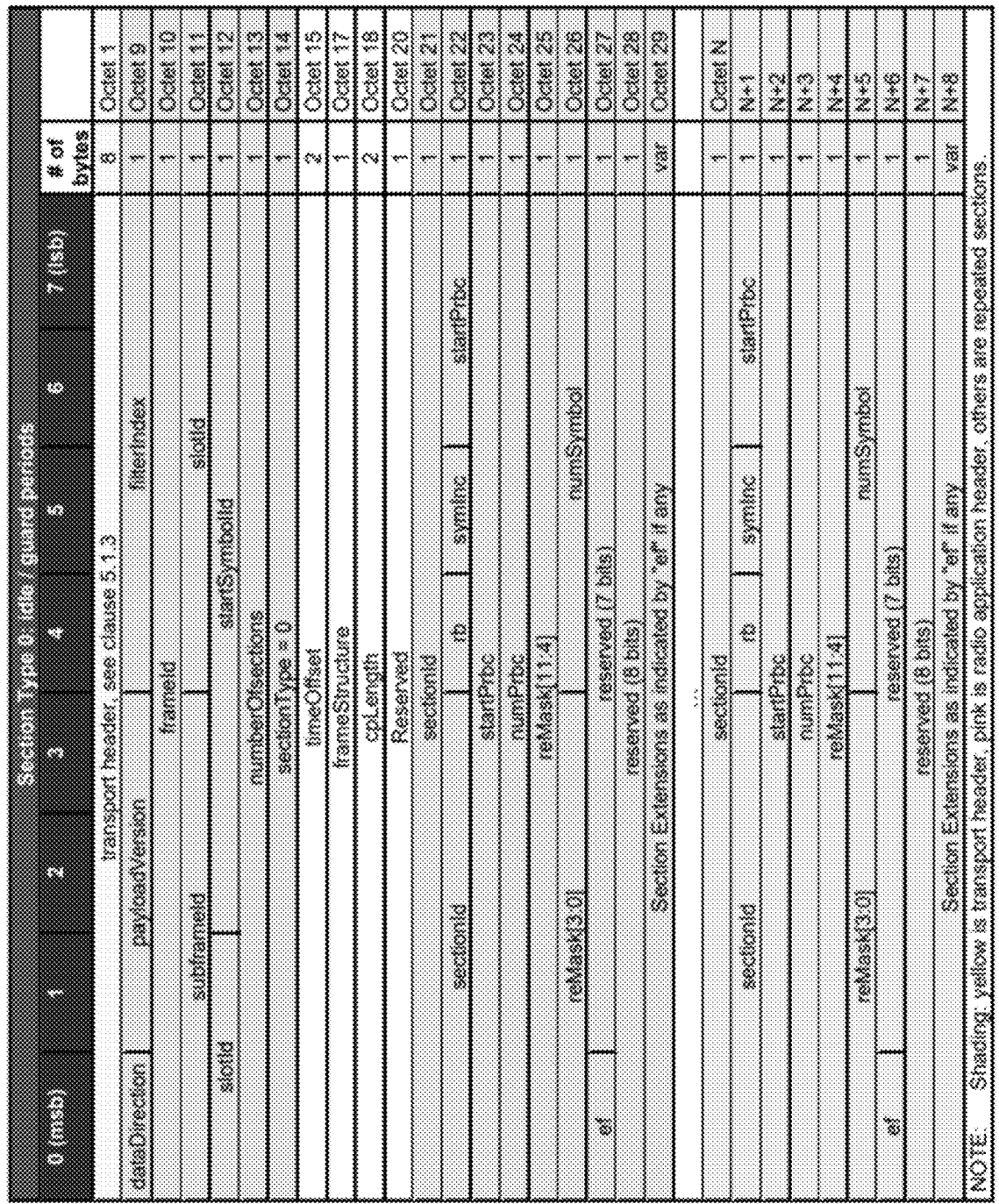
FIG. 10 shows an illustrative control-plane (C-Plane) frame format as defined by ETSI (European Telecommunications Standards Institute) TS 103 859.

The xRAN 7.2x protocol is illustratively shown in a message flow 900 in FIG. 9 in which xRAN messages are exchanged between an O-RU 905 (open-RU as defined by the O-RAN Alliance) and an O-DU 910 (open-DU as defined by the O-RAN Alliance). Downlink (DL) messages for the control plane (C-Plane) and user plane (U-Plane) are shown on the left side of the drawing. Uplink (UL) messages for the C-Plane and U-Plane are shown on the right side of the drawing. A C-Plane frame format 1000 and U-Plane frame format 1100 are respectively shown in FIGS. 10 and 11, as defined by ETSI TS 103 859.

Referring again to FIG. 3, the multiplexing performed at the IQ multiplexer 325 is informed by the observations that the source DU 310 and destination DU 315 have the exact same timing and slot alignment, as derived, for example, using PTP (precision time protocol). The source and destination DUs further have the exact same configuration with respect to the xRAN messaging, as the C-Plane and U-Plane messages are generated at the same time with the same order. In addition, the C-Plane messages for the source and destination DUs are identical. The UL U-Plane messages are also identical for the source and destination DUs.

Applying the above observations, an illustrative and non-limiting example of an IQ multiplexing algorithm that applies forwarding rules is shown below. It may be appreciated that suitable modifications to the algorithm can be made to accommodate various alternative cell configurations that utilize, for example, beamforming and/or carrier aggregation.

1. C-plane: Forward C-plane packets from the source DU to the RU and drop C-plane packets from the destination DU;
2. UL U-plane: Forward UL U-plane packets to both the source and destination DUs;
3. DL U-plane:
    1. For source DU:
        1. If xRAN packet is for RU endpoint that corresponds to PDCCH/SSB symbol, forward;
        2. If xRAN packet is for an RU endpoint that corresponds to PDSCH, if it is for slot allocated to this DU forward, else drop;
    2. For destination DU:
        1. If xRAN packet is for RU endpoint that corresponds to PDCCH/SSB symbol, remap the packet to a free RU endpoint by modifying the header and forward;
           Note: This implies that the original RU endpoint is already taken by the source DU for its own PDCCH, which happens because both source and destination DU have the same cell configuration.
        2. If xRAN packet is for an RU endpoint that corresponds to PDSCH, if it is for slot allocated to this DU, forward, else drop.

Figure 12:
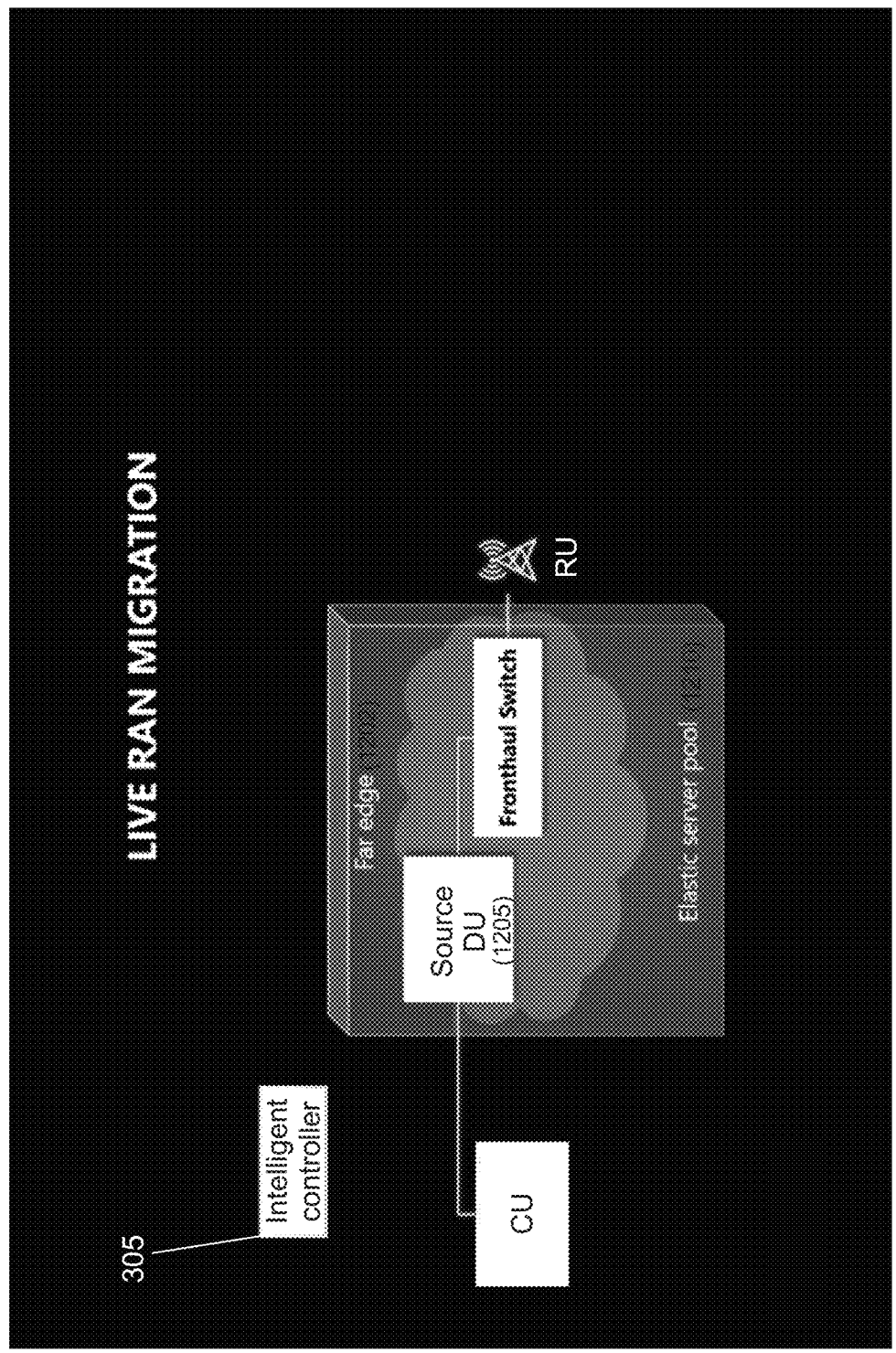
FIGS. 12-16 show an illustrative example of RAN live migration.
Figure 13:
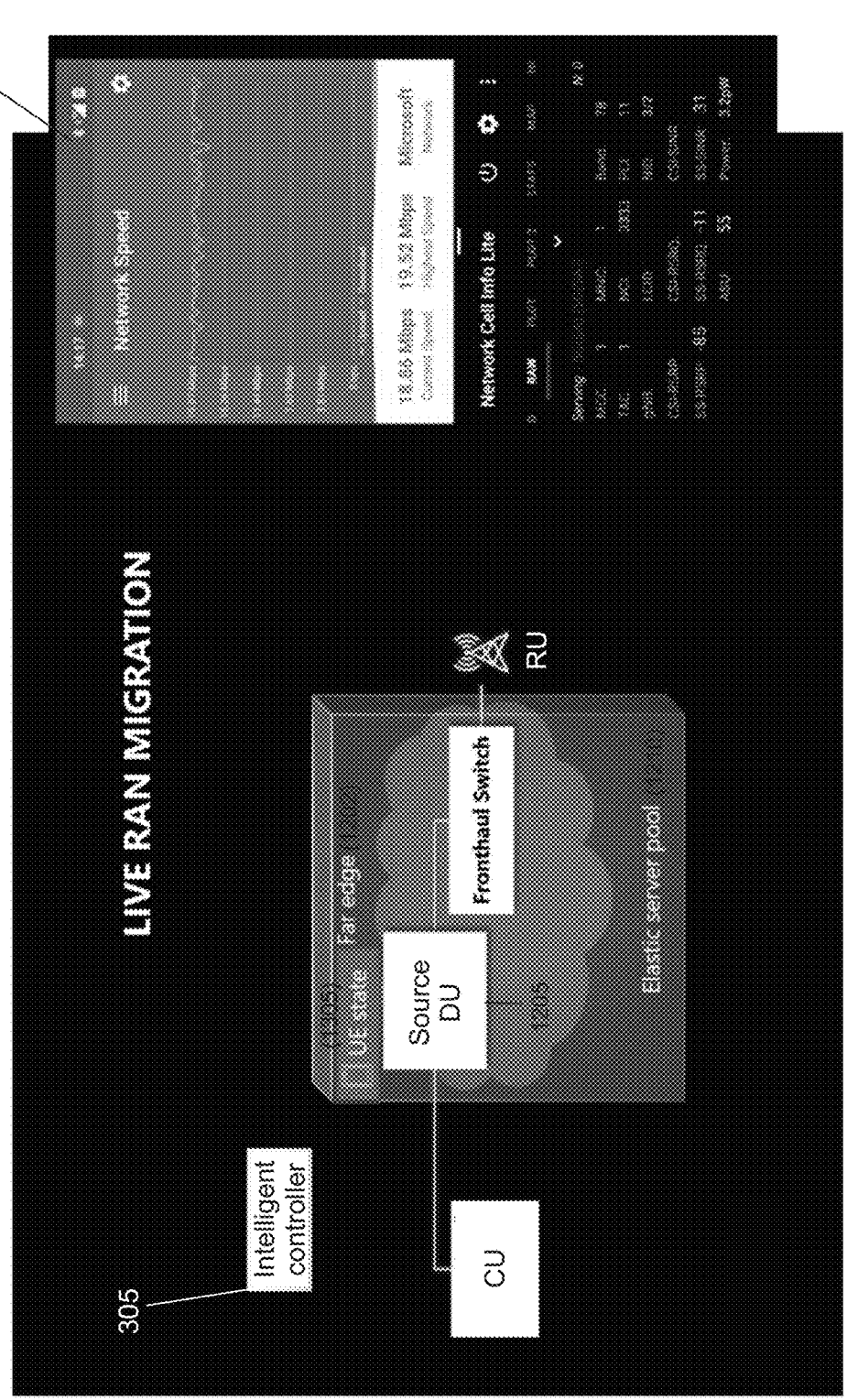

FIGS. 12-16 show an illustrative example of RAN live migration. In FIG. 12, UEs (not shown) are connected to a source DU 1205 located at a far-edge of cloud-computing infrastructure 1202 as part of an elastic server pool 1210. The UEs may (or may not) be sending traffic through the network. UE state and other telemetry data (exemplary details are shown on the right side of the drawing, and representatively indicated by reference numeral 1305) are collected by the intelligent controller 305, as shown in FIG. 13.

Figure 14:
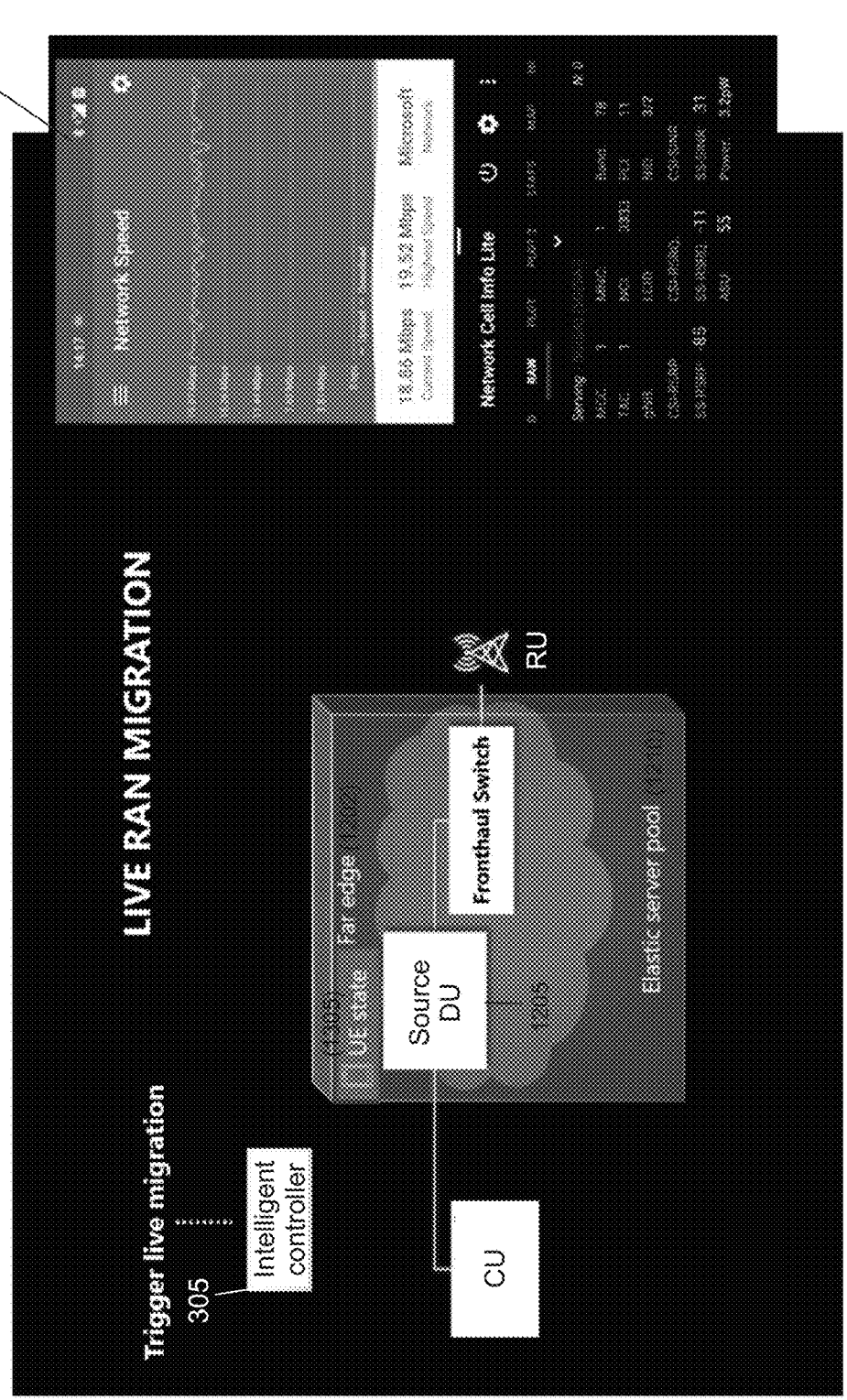
Figure 15:
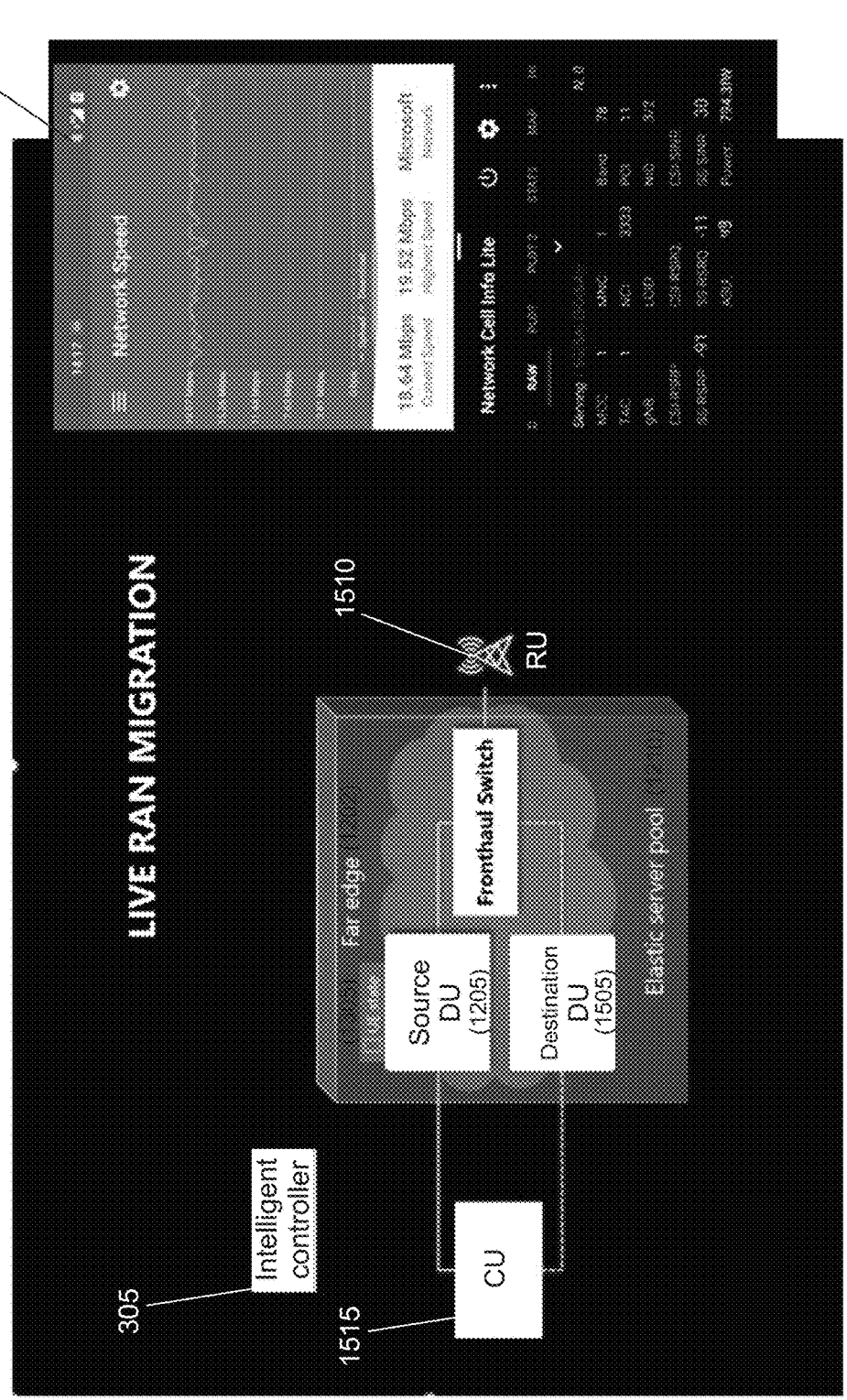

FIG. 14 shows a live migration is triggered. For example, as shown in FIG. 15, UEs (not shown) may be handed over from the source DU 1205 to a destination DU for several reasons, for example, energy savings at a datacenter, software upgrades, or implementation of elastic pooling of computer and/or other resources. In FIG. 15, the intelligent controller brings up another DU (e.g., a destination DU 1505). The destination DU has a cell configuration that differs from that of the source DU. Such differences include, for example, MIB/SIB located at different locations on the radio resource grid. In addition, different cell identities are utilized between the source and destination DUs including for example, physical cell identifier (PCI) and scrambling IDs.

The intelligent controller 305 initially configures the IQ multiplexer (not shown) to block all the xRAN packets to and from the destination DU 1505. The intelligent controller configures the source and destination DUs to utilize non-overlapping radio resources for both UL and DL user data (e.g., PDSCH/ULSCH channels). Typically, the intelligent controller ensures that only one DU is transmitting and/or receiving user data (PDSCH/ULSCH) at any given UL/DL slot. For example, assuming 10 slots, the source DU 1205 is allowed to transmit data at slots 0, 1, 2, 3, and 4 while the destination DU is allowed to transmit data at slots 5, 6, 7, 8, and 9. The intelligent controller can dynamically modify the slot assignments based on traffic load (as indicated by telemetry data). The radio resources are proportionally allocated based on traffic load at each DU in typical cases.

The intelligent controller 305 creates and/or updates the forwarding rules provided to the IQ multiplexer to allow xRAN traffic at both the source DU 1205 and destination DU 1505 to be carried to and from an RU 1510. The rule creation and/or updating takes into account the different cell configurations for the DUs and the multiplexing algorithm discussed above.

The intelligent controller 305 implements handovers of the UEs from the source DU 1205 to the destination DU

1505. In an illustrative example, optimized handover is accomplished by the intelligent controller implementing an order of UE handover between the source DU and destination DU based on real-time telemetry data from the DU and CUs (represenatively indicated by reference numeral 1515) that indicates traffic loading on a given UE. UEs carrying a traffic load that is below a predetermined threshold are handed over from the source DU to the destination DU first, and the intelligent controller's selection of the next UE to hand over is based on current traffic loading. For example, a UE with the lowest uplink (UL) and downlink (DL) queues is handed over next.

In scenarios in which telemetry data indicates that a UE is above the predetermined traffic load threshold, handover is not attempted. Instead, the intelligent controller 305 is configured to implement a predetermined wait interval before checking traffic load on the UE again. Once the traffic load drops below the predetermined threshold, then the handover from the source to destination DU is performed.

Figure 16:
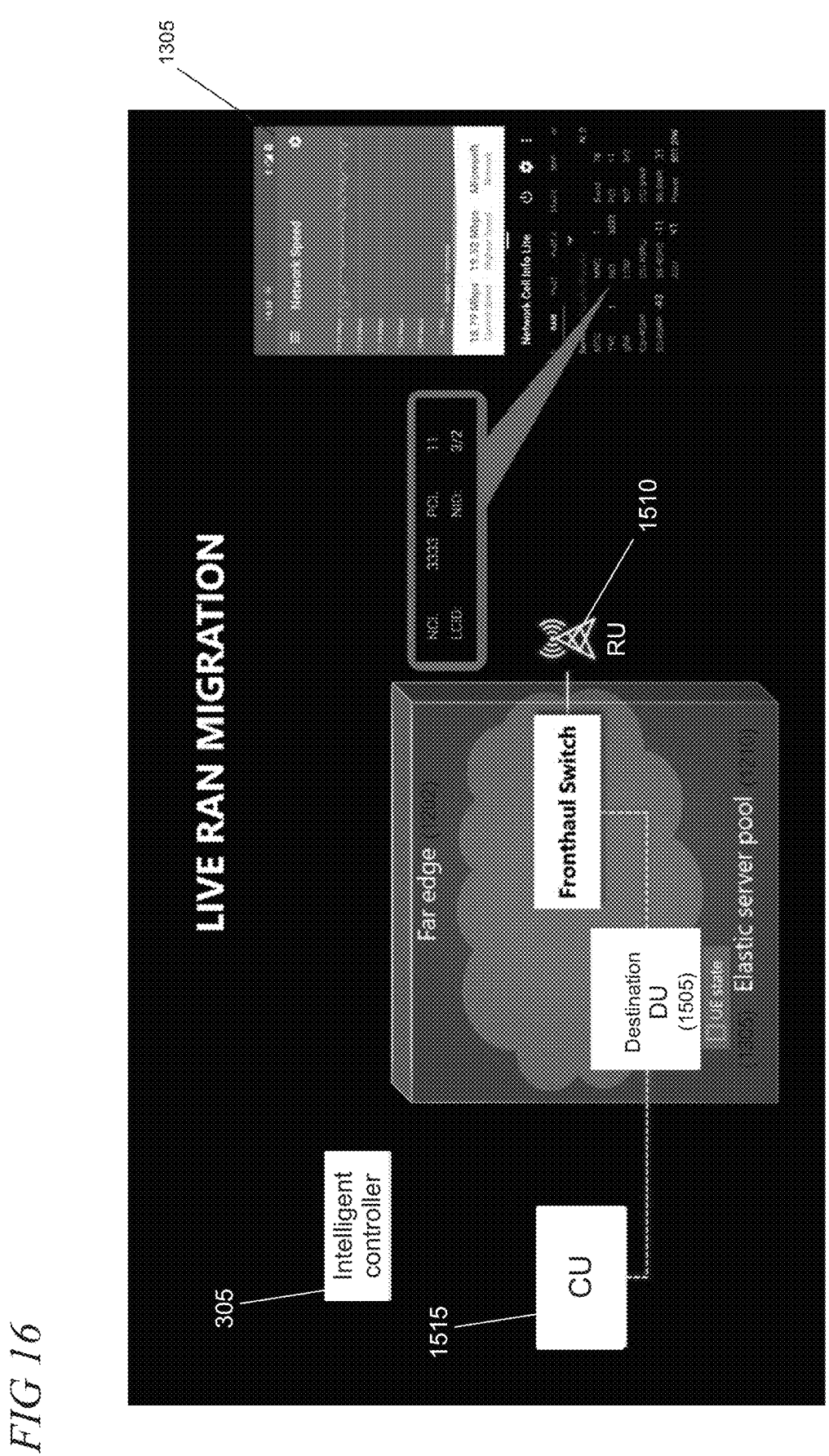

The intelligent controller 305 next updates the IQ multiplexer to block all xRAN traffic to and from the source DU 1205 and forwards all the traffic to and from the destination DU 1505. The intelligent controller configures the destination DU to utilize all the resource blocks for both UL and DL user data, and then brings down the source DU, as shown in FIG. 16.

Figure 17:
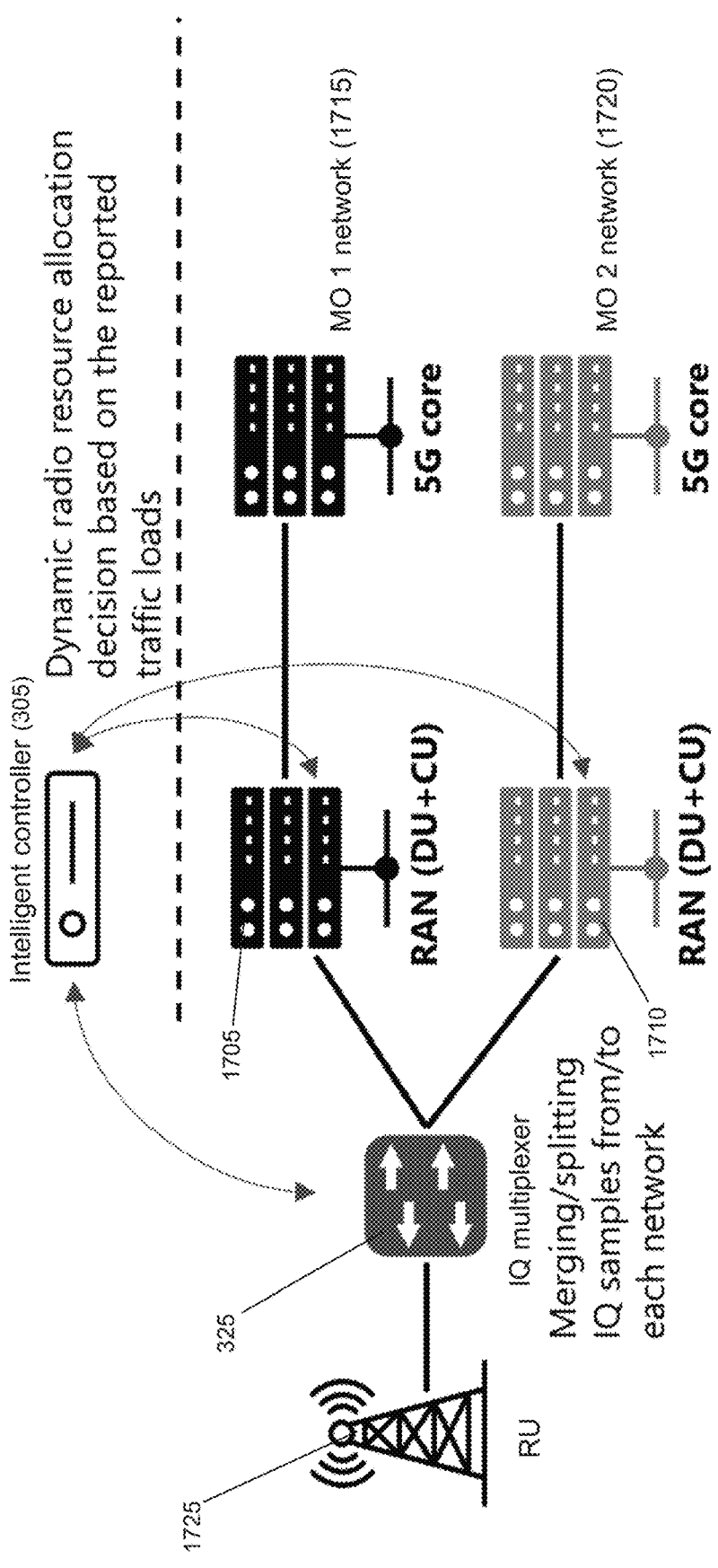
FIG. 17 shows an illustrative example of RAN sharing.

FIG. 17 shows an illustrative use case example 1700 of RAN sharing in which multiple RANs 1705 and 1710, each comprising a DU and CU and associated with different MO core networks 1715 and 1720, utilize a single RU 1725. For example, such RAN sharing is utilizable in MORAN (multi-operator radio access network) and MOCN (multi-operator core network) scenarios. Other use cases supported by RAN sharing include multi-vendor network slicing, in which different network slices use different functions from different vendors. For example, an RU is supplied by vendor A, a DU by vendor B, and a CU by vendor C. 5G network slicing is discussed below in the description accompanying FIGS. 19 and 20.

In RAN sharing, as with RAN live migration, the IQ multiplexer performs IQ sample multiplexing for traffic on each network according to dynamic radio resource allocation implemented by the forwarding rules from the intelligent controller which are based on traffic loads determined from the telemetry data. However, unlike RAN live migration, no handovers are performed in RAN sharing scenarios.

The following discussion provides information about 5G mobile networks to provide context and background to the present 5G RAN live migration and sharing. 5G mobile networks utilize a service-based architecture that supports data connectivity and services enabling deployments using techniques such as, for example, Network Function Virtualization (NFV), Software Defined Networking (SDN), and cloud computing. Some exemplary features and concepts of 5G networking include separating User Plane (UP) functions from Control Plane (CP) functions allowing independent scalability, evolution, and flexible deployment across, for example, central locations and/or distributed (i.e., remote) locations. The functional design of 5G networks is modularized to enable flexible and efficient network slicing. Dependencies are also minimized between the Radio Access Network (RAN) and the Core Network (CN). The 5G architecture is thus defined with a converged core network with a common AN-CN interface which integrates different Access Types, for example 3GPP (3rd Generation Partnership Project) access and untrusted non-3GPP access such as WiMAX, cdma2000®, WLAN, or fixed networks.

The International Mobile Telecommunications (IMT) recommendation for 2020 from the International Telecommunication Union Radiocommunication Sector (ITU-R M.2083-0) envisions usage scenarios for 5G networks that include: Mobile Broadband (MBB), as indicated by reference numeral 1805; Ultra-Reliable and Low Latency Communications (URLLC) 1810; and Massive Machine Type Communications (MMTC) 1815, as shown in the usage scenario footprint 1800 in FIG. 18.

The MBB usage scenario 1805 addresses the human-centric use cases for access to multi-media content, services, and data. The demand for mobile broadband will continue to increase, leading to enhanced Mobile Broadband. The enhanced MBB usage scenario will come with new application areas and requirements in addition to existing MBB applications for improved performance and an increasingly seamless user experience. The enhanced MBB usage scenario may cover a range of cases, including wide-area coverage and hotspot, which have different requirements.

For the hotspot case (i.e., for an area with high user density), very high traffic capacity is needed, while the requirement for mobility is typically low and user data rate is higher than that of wide-area coverage. For the wide-area coverage case, seamless coverage and medium to high mobility are desired, with much improved user data rate-20 Gbps for download and 10 Gbps for upload-compared to existing data rates. However, the data rate requirement may be relaxed compared to hotspot.

The URLLC usage scenario 1810 may typically have relatively stringent requirements for capabilities such as latency and availability. For example, latency in the RAN may be expected to be less than 1 ms with high reliability. Some examples include wireless control of industrial manufacturing or production processes, remote medical surgery, distribution automation in a smart grid, transportation safety, etc.

The MMTC usage scenario 1815 may be characterized by a very large number of connected devices such as Internet of Things (IoT) devices with hundreds of thousands of connected devices per square kilometer. MMTC may also be referred to as "Massive IoT" (MIOT) in some 5G literature. Such connected devices can be expected to transmit a relatively low volume of non-delay-sensitive data. Devices are typically required to be low cost and have a very long battery life.

Figure 18:
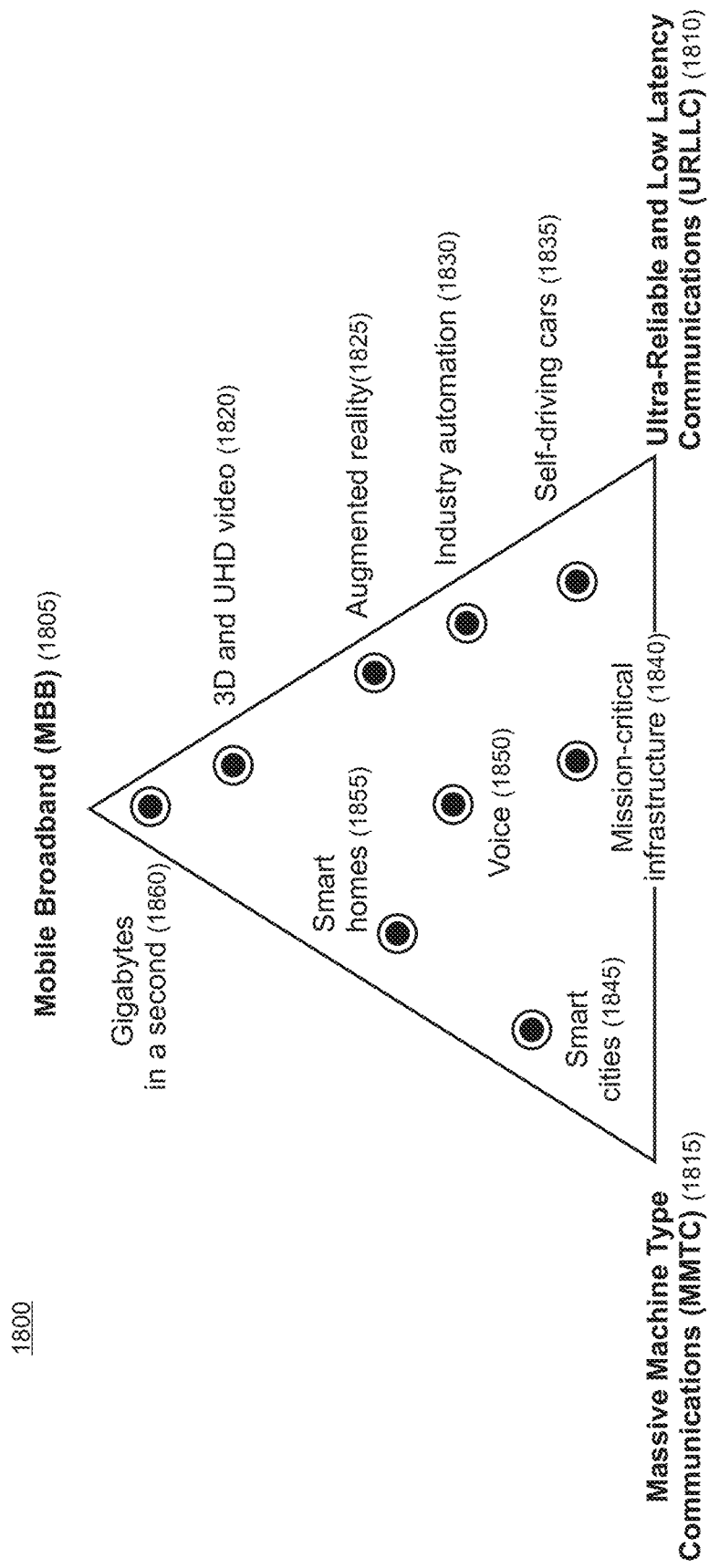
FIG. 18 shows illustrative 5G network usage scenario examples.

Illustrative applications for 5G networking are also shown in FIG. 18. The applications can fall within the usage scenario examples 1800 at different locations depending on a given balance of application networking requirements. As shown, the illustrative applications can include three-dimensional and/or ultra-high-definition (3D and UHD) 1820; augmented reality 1825; industry automation 1830; self-driving cars 1835; mission-critical infrastructure 1840; smart cities 1845; voice 1850; smart homes 1855; and gigabytes in a second 1860.

It is emphasized that the ITU expects additional 5G usage scenarios and applications to emerge, and 5G network operators may not necessarily be limited to or required to support any particular usage scenarios or pre-defined slice types. Similarly, application and service providers may be expected to leverage the higher speeds and lower latency of 5G to develop feature-rich capabilities for all kinds of connected devices (both fixed and mobile), deliver compelling user experiences across a range of computing devices and platforms, and further realize the potential of artificial intelligence (AI) and IoT in a way that current connectivity prohibits.

With 5G, mobile networks can be optimized, as features such as network slicing become available for both operators and enterprises deploying 5G infrastructure. A network slice is a logical (i.e., virtual) network customized to serve a defined purpose, type/class of service, quality of services (QoS), or dedicated customers. A 5G network slice may be dynamically created consisting of an end-to-end composition of all the varied network resources and infrastructure needed to satisfy the specific performance and requirements of a particular service class or application that may meet some pre-defined service level agreement (SLA). Each portion of the 5G network is respectively sliced such that the network can be viewed as being composed of RAN slices, mobile core slices, cloud slices, etc. 5G network slicing thus enables creation of multiple logical and secure networks that are isolated from each other, but which span over the same common physical network infrastructure.

5G network slices may consist of resources composed into an end-to-end service delivery construct. These may include physical resources, either a share or profile allocated to a slice, or dedicated physical resources in some cases. Slices also consist of logical entities such as configured network functions, management functions, VPNs (virtual private networks), etc. Resources (physical or logical) can be dedicated to a 5G network slice, i.e., separate instances, or they may be shared across multiple slices. These resources are not necessarily all produced within the mobile network provider as some may comprise services consumed from other providers, facilitating, for example, aggregation, cloud infrastructure, roaming, etc.

Figure 19:
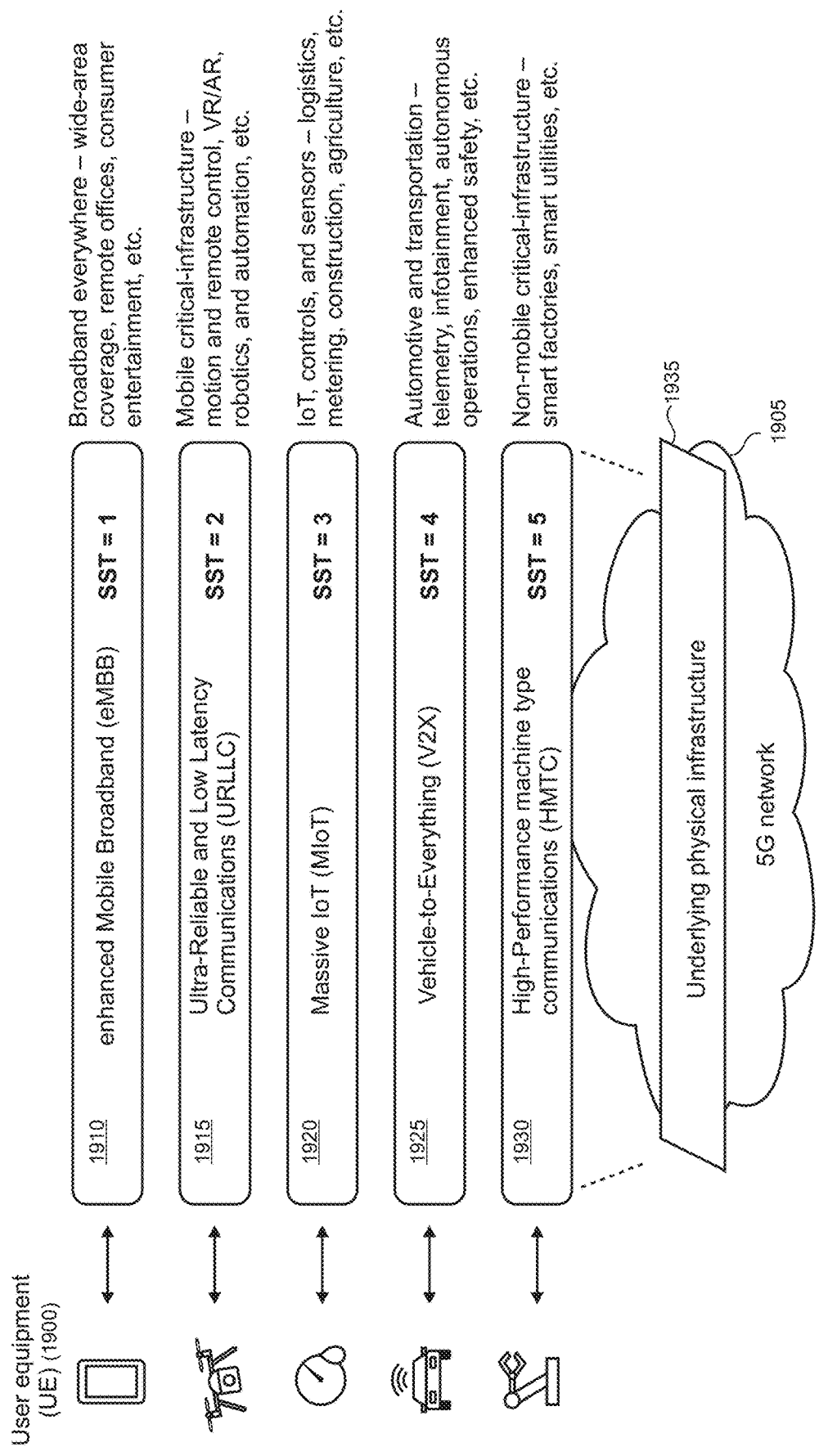
FIG. 19 shows illustrative standardized 5G network slices.

3GPP is the principal standards organization engaged in the architecture development for 5G. Several iterations of standards releases have established a foundation for the current phase of slice-specific definition. The 3GPP R15 System Architecture (3GPP TS 23.501) currently defines standard service-based Slice/Service types (SST). As shown in FIG. 19, the standardized 3GPP network slices of a 5G network 1905 include eMBB (enhanced Mobile Broadband) (SST=1), URLLC (SST=2), and MIoT (SST=3) which correspond to the usage scenarios described by ITU-R 2083-0. Additional standardized SST values for V2X (Vehicle-to-Everything) (SST=4) and HMTC (High-Performance Machine Type Communications (SST=5) are also defined by 3GPP. It may be appreciated that slice service types beyond those having standardized SST values can be defined.

The five standardized or pre-defined service types for 5G network slices are respectively indicated by reference numerals 1910, 1915, 1920, 1925, and 1930 in FIG. 19. IMT-2020 describes the concept of network slicing as supporting a wide variety of requirements in UE and application services using a network where multiple logical network instances tailored to the requirements can be created. Network slicing allows the 5G network operator to provide dedicated logical networks (i.e., network slices) with customer-specific functionality. The 5G architecture enables different network configurations in different network slices.

A network slice can be dedicated to different types of services and span all the domains of the underlying physical infrastructure 1935, such as the transport network supporting flexible locations of functions, dedicated radio configurations or specific radio access technologies (RATs), and the mobile core network. Network slices can also be deployed across multiple operators. Slices can share common physical infrastructure or may have dedicated resources and/or functions in some cases. Different types of network slices can be composed of not only standardized network functions but also some proprietary functions that may be provided by different operators or third parties.

Standardized SST values and pre-defined slice types provide a way for establishing global interoperability for 5G network slicing so that operators can efficiently support key industry verticals—for example, industrial automation, healthcare, entertainment, transportation, manufacturing, energy, agriculture, construction, security, etc.—for the most commonly used pre-defined Slice/Service Types. Additional customization and/or specialization for applications and services may be implemented for specific usage scenarios. A UE may provide Network Slice Selection Assistance Information (NSSAI) parameters to the network to help it select a RAN and a core network part of a slice instance for the device. A single NSSAI may lead to the selection of several slices. NSSAI consists of Session Management NSSAIs (SM-NSSAI), which each include an SST and possibly a Slice Differentiator (SD). SST may refer to an expected network behavior in terms of features, e.g., broadband or IoT, while the SD can help in the selection among several slice instances of the same type. It is noted that services supported in a standardized pre-defined slice may also be supported by other pre-defined slices having other (i.e., non-standard) SST values.

FIG. 19 shows UE 1900 that may be representative of the wide variety of device types that may utilize 5G networking including, for example and not by way of limitation, smartphones and computing devices, drones, robots, process automation equipment, sensors, control devices, vehicles, transportation equipment, tactile interaction equipment, virtual and augmented reality (VR and AR) devices, industrial machines, and the like. The standardized slices can be respectively mapped to such UE types in typical usage scenarios to optimize network utilization and user experiences, but 5G network slicing is designed for flexibility to meet demand across a wide spectrum of device types and diverse applications and services. The network softwarization provided by SDN and NFV paradigms in 5G enables network slice configuration—i.e., how various physical infrastructure and network resources are deployed—to be rapidly and dynamically adapted to ensure that performance objectives are continuously met for 5G applications across a given population of UEs.

As shown, the configuration of eMBB slice 1910 may be optimized for broadband-everywhere usage scenarios across a wide coverage area for applications such as consumer entertainment (e.g., video, gaming, streaming), remote offices, etc., where maximized network speeds and data rates are desired and high traffic volumes are typically experienced. The URLLC slice 1915 may be configured for mobile critical-infrastructure low-latency usage scenarios including applications such as remote-control operations in medical and industrial environments, VR and AR, robotics and automation, etc.

The MIOT slice 1920 may be configured for optimal handling of IoT, control, and sensor applications relating to logistics, construction, and metering in vertical industries such as construction and agriculture. The V2X slice 1925 may be optimized for automotive and transportation applications such as telemetry, infotainment, autonomous operations, enhanced safety, and the like. The HMTC slice 1930 is typically configured for optimal handling of non-mobile/fixed critical-infrastructure applications such as smart factories, smart utilities, etc.

Figure 20:
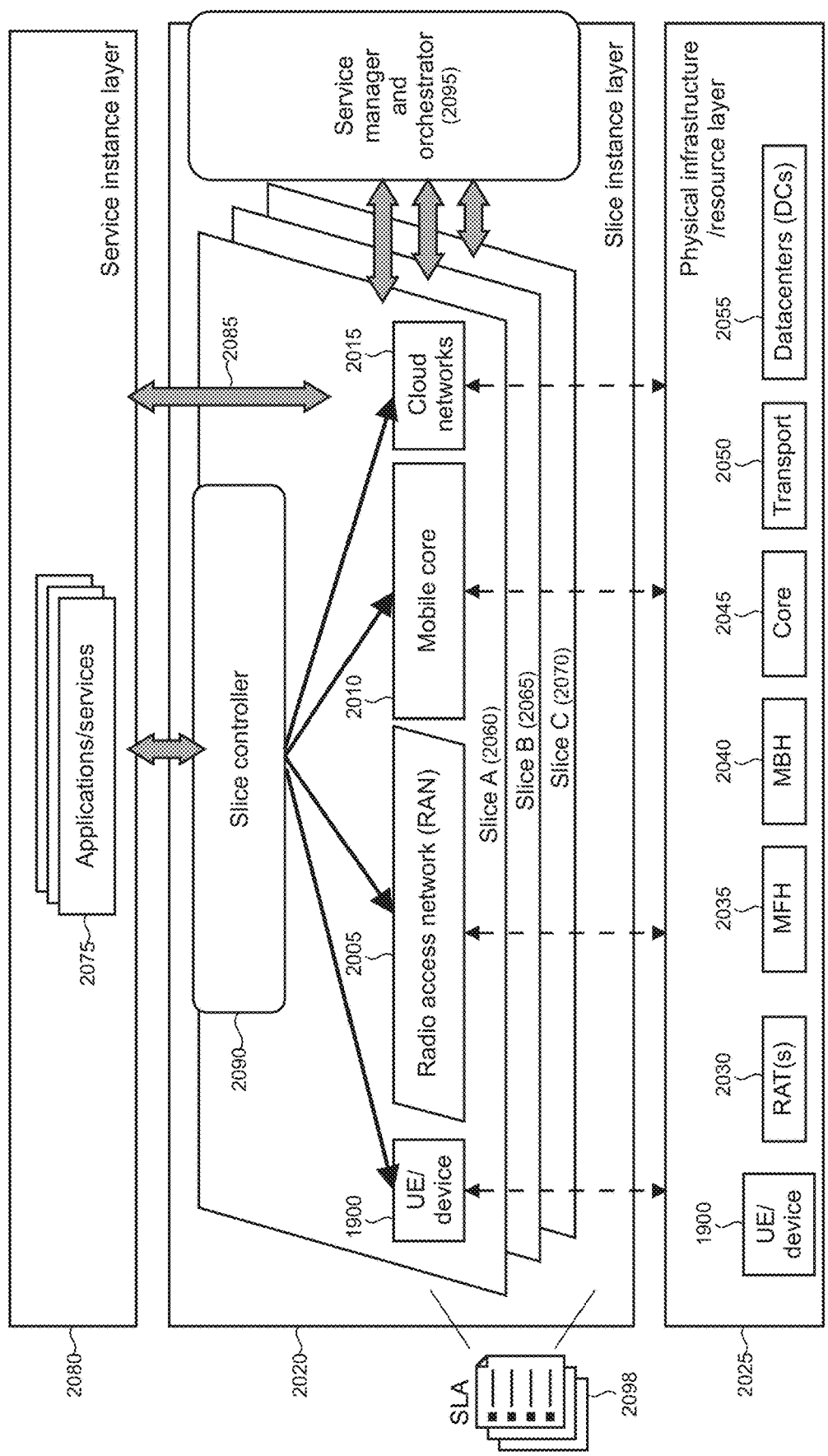
FIG. 20 shows an illustrative layered 5G network slicing framework.

FIG. 20 shows an illustrative layered 5G network slicing framework 2000 that is described in the IMT-2020 recommendation. The framework comprises a RAN 2005, mobile packet core 2010, and cloud networking components 2015 that are logically represented in a network slice instance layer 2020 that sits above a physical infrastructure layer 2025 in the framework. The physical infrastructure layer provides an abstraction of radio, compute, network, and storage resources which may include, for example, one or more RATs 2030, mobile fronthaul (MFH) 2035, mobile backhaul (MBH) 2040, mobile core network 2045, transport 2050, and one or more datacenters (DCs) 2055. In some cases, one or more UE instances may be implemented as resources.

In this illustrative example, the slice instance layer includes three 5G network slices-Slice A 2060, Slice B 2065, and Slice C 2070, but more or fewer slices may be utilized in any given implementation at any given time. These slices may include one or more of the pre-defined slice types shown in FIG. 19 and described in the accompanying text or comprise different slice types.

Slices may be isolated by logically or physically isolating their underlying resources. The slices can support instances of various applications and/or services (collectively indicated by reference numeral 2075) in a service instance layer 2080, for example, using an application programming interface (API), as representatively indicated by reference numeral 2085. Each network slice may be viewed as an independent logical collection of resources which can dynamically vary in configuration from slice to slice as needed to meet pre-defined technical characteristics (e.g., throughput, latency, reliability, etc.) and/or business characteristics as required by an application/service instance.

A slice controller 2090 is utilized with the slicing framework 2000 to maintain awareness of the application requirements to responsively allocate and manage the virtualized network functions and resources in each slice. A service manager and orchestrator 2095 combines the necessary resources and functions to produce a network slice instance. Its main tasks include creation of slice instances upon the underlying physical infrastructure, dynamically mapping network functions to slice instances to meet changing context and maintaining communication between the application and services and the framework to manage slice lifecycle.

As shown, a service level agreement (SLA) 2098 is typically applicable to each of the slices 2060, 2065, and 2070. The applicable SLAs can vary in scope and composition. The slice controller 2090 may be advantageously utilized to perform resource allocation among RAN slices to meet the connectivity requirements while ensuring compliance with applicable SLA guarantees in some cases.

An SLA may be defined as a contract between the provider of a service and its internal or external end-user or customer that defines what services the provider will offer and the level of performance it must meet as well as any remedies or penalties should the agreed-upon levels not be realized. According to the ITU, an "SLA is a formal agreement between two or more entities that is reached after a negotiating activity with the scope to assess service characteristics, responsibilities and priorities of every part." SLAs typically establish customer expectations for a provider's performance and quality. Various types of customers can be supported by the present 5G RAN live migration and sharing, typically depending on applicable circumstances and context. For example, customers may include, but are not limited to consumers, businesses, enterprises, organizations, service providers, application developers, and the like. A 5G network operator may support its own services to customers as well as services from multiple different third-party providers. For example, one third-party provider may offer services to customers on one particular network slice while another third-party provider offers services on another network slice. Each discrete service offering may have its own corresponding distinct SLA.

SLA terms may include metrics covering technical aspects of service, for example describing a level and volume of communication services and which measure the performance characteristics of a provided service. Such technical metrics may include but not be limited to, for example, availability, throughput, latency, bit/packet error rate, and energy. SLAs may also include business, economic, and legal terms covering the agreement between the service provider and the customer. SLAs for different service and slice types can vary. For example, some slice types have more elasticity with regard to RAN resource allocation where resources can be readily adjusted depending on resource demand. Other slice types may be more inelastic. For example, the URLLC slice type may require strict resource allocation to guarantee reliability and low latency under a corresponding SLA, while enhanced MBB resources may be readily scaled downward once the edge cloud buffering is complete.

Figure 21:
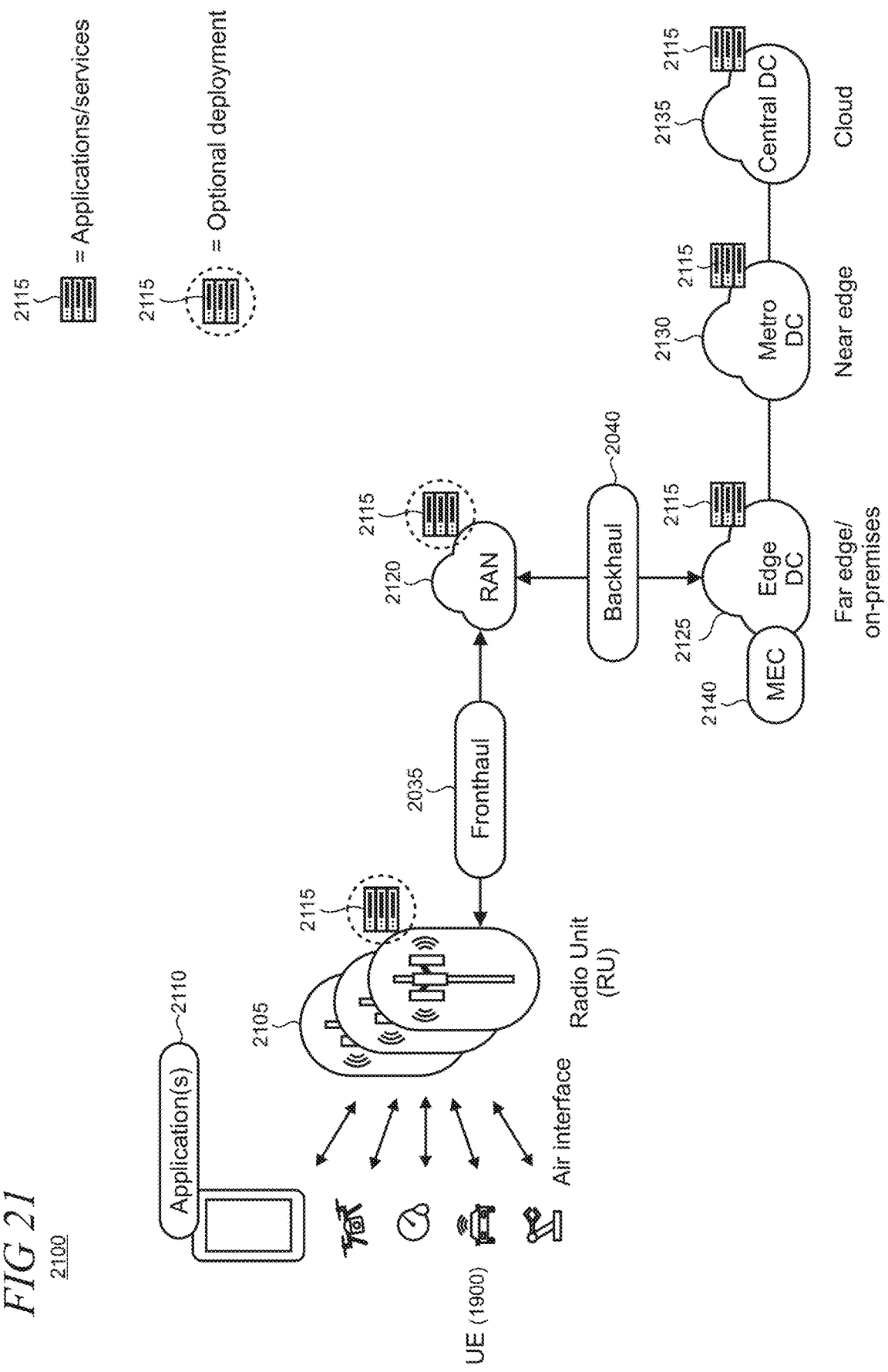
FIG. 21 shows illustrative physical infrastructure in a 5G network architecture.

FIG. 21 shows illustrative physical infrastructure in a 5G network 2100. Multiple instances of a radio unit (RU) 2105 are configured to interact with a diverse population of UE 1900 over an air interface. Each UE typically includes one or more local applications 2110 or client-side software/firmware component that is arranged to interface with one or more remote application servers, service providers, or other resources (collectively indicated by reference numeral 2115) and thus require network connectivity to such remote facilities.

The RUs are coupled by the mobile fronthaul 2035 to a RAN 2120. The RAN is coupled by the mobile backhaul 2040 to one or more datacenters (DCs). In this illustrative example, the DCs comprise an edge DC 2125, a metro DC 2130, and a central DC 2135. In some networking literature, the edge DC may be referred to as a far edge or on-premises DC. The metro DC may be referred to as a near edge DC, and the central DC may be referred to as the cloud. In some implementations, the edge DC may support multi-access edge computing (MEC) functions 2140.

The application servers 2115 can be located at various points in the network architecture 2100 to meet technical requirements and traffic demands. Typically, the application servers will be physically located closer to the UE 1900 in cases where latency is sought to be minimized. However, an operator's application server location criteria may also consider factors such as management ease, scalability, and security, among other factors. In some implementations, an operator may optionally deploy application servers and other resources in the RAN 2120 or RU 2105, as indicated by the dashed circles in FIG. 21.

Figure 22:
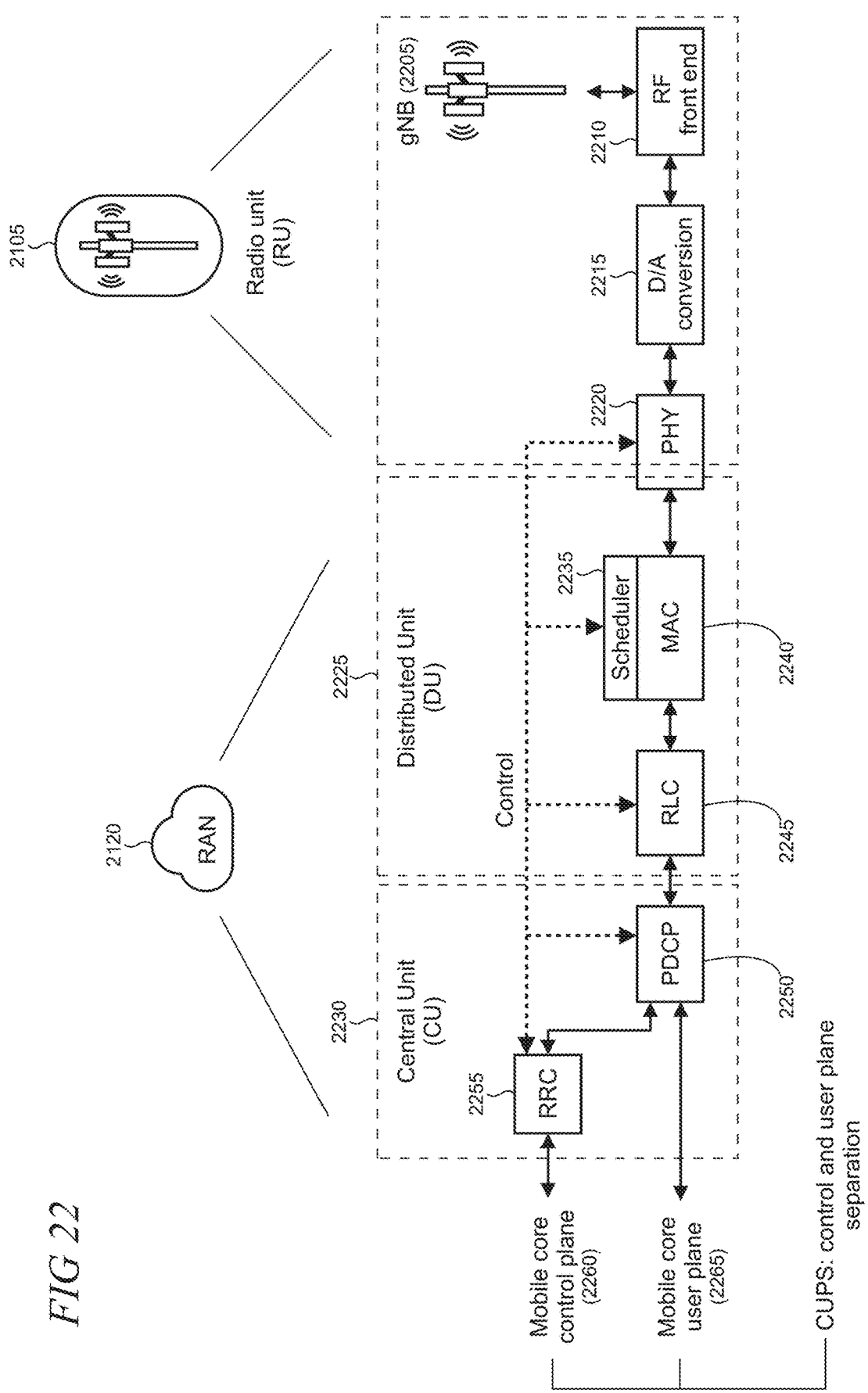
FIG. 22 shows an illustrative 5G radio access network (RAN) and radio unit (RU)

FIG. 22 shows functional blocks of the RAN 2120 and RU 2105. The RU comprises radio transmission points, for example, a next generation Node B, gNB 2205, which handles radio communications with the UE. The gNB is serially coupled to a radio frequency (RF) front end 2210, a digital to analog (D/A) conversion unit 2215, and a portion of the functionality of the physical (PHY) layer 2220 as described in the OSI (Open Systems Interconnection) model.

Under 3GPP and O-RAN (Open RAN) Alliance, the processing pipeline of the RAN 2120 is split into a distributed unit (DU) 2225, and a central unit (CU) 2230. The DU is responsible for real-time layers 1 and 2 (L1 and L2)

scheduling functions, and the CU is responsible for non-real-time, higher L2 and L3 functions. Accordingly, the DU comprises a scheduler 2235 located on top of a MAC (Medium Access Control) layer component 2240, an RLC (radio link control) layer component 2245, and parts of a PHY (physical) layer component 2220. The MAC layer component is responsible for buffering, multiplexing, and demultiplexing segments, including all real-time scheduling decisions about which segments are transmitted when. It is also able to make a "late" forwarding decision (i.e., to alternative carrier frequencies, including Wi-Fi, for example). The PHY layer component is responsible for coding and modulation.

The CU 2230 is configured with a PDCP (Packet Data Convergence Protocol) layer component 2250 and RRC (Radio Resource Control) layer component 2255. The PDCP layer component is responsible for compressing and decompressing IP (Internet protocol) headers, ciphering and integrity protection, and making an "early" forwarding decision (i.e., whether to send the packet down the pipeline to the UE or forward it to another base station). The RRC layer component is responsible for configuring the coarse-grain and policy-related aspects of the RAN processing pipeline. The RRC layer component interfaces with the control plane 2260 while the PDCP layer component interfaces with the user plane 2265 to thereby implement the "CUPS" feature of 5G (control and user plane separation).

Figure 23:
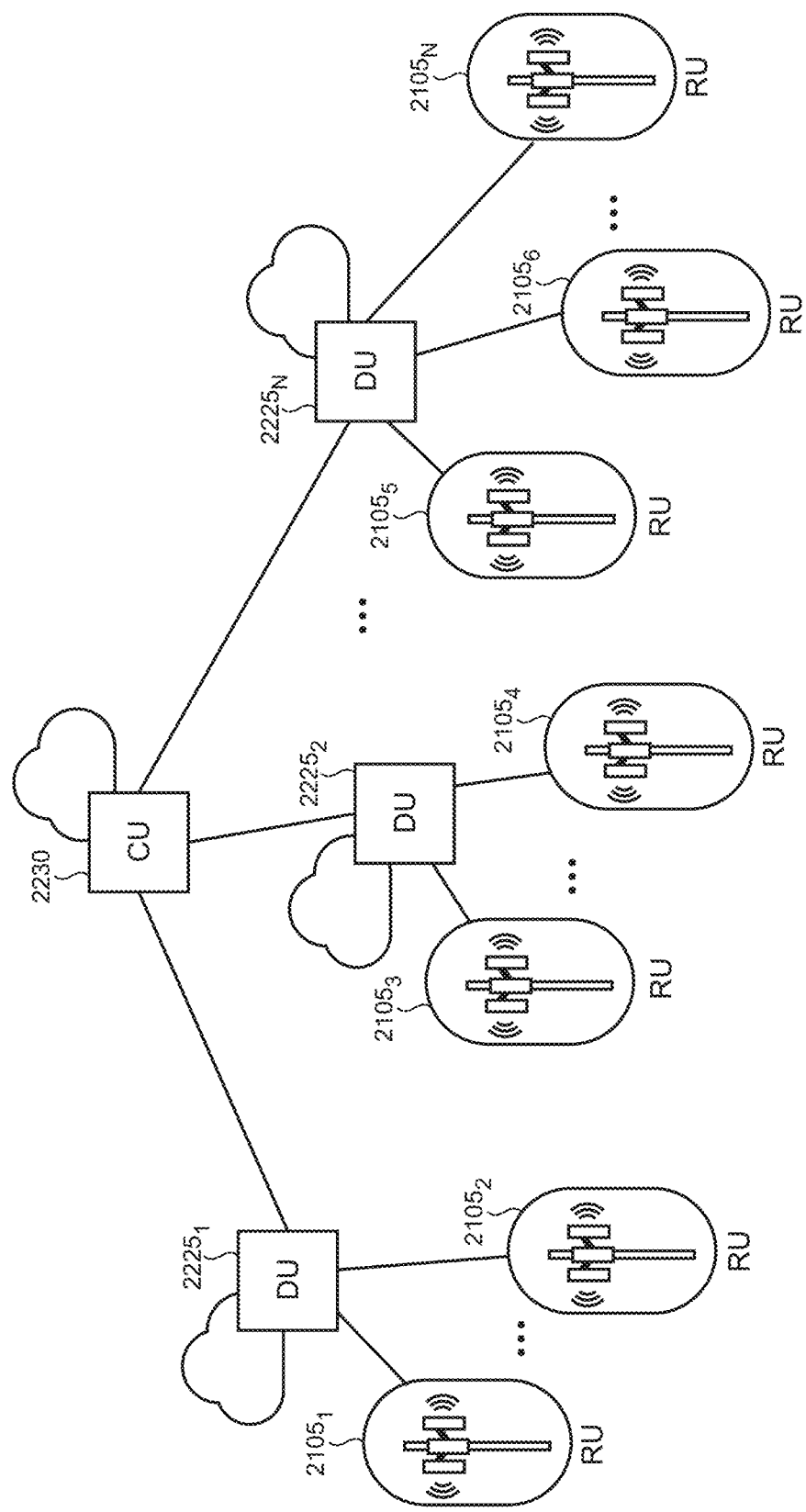
FIG. 23 shows an illustrative split-RAN hierarchy in which a central unit (CU) may support multiple distributed units (DUs) which, in turn, may support multiple RUS.

The split-RAN configuration shown in FIG. 22 enables RAN functionality to be split among physical infrastructure elements in central and distributed locations. For example, as shown in FIG. 23, a single CU 2230 may be configured to serve multiple DUs 2225, each of which in turn serves multiple RUs 2105.

Figure 24:
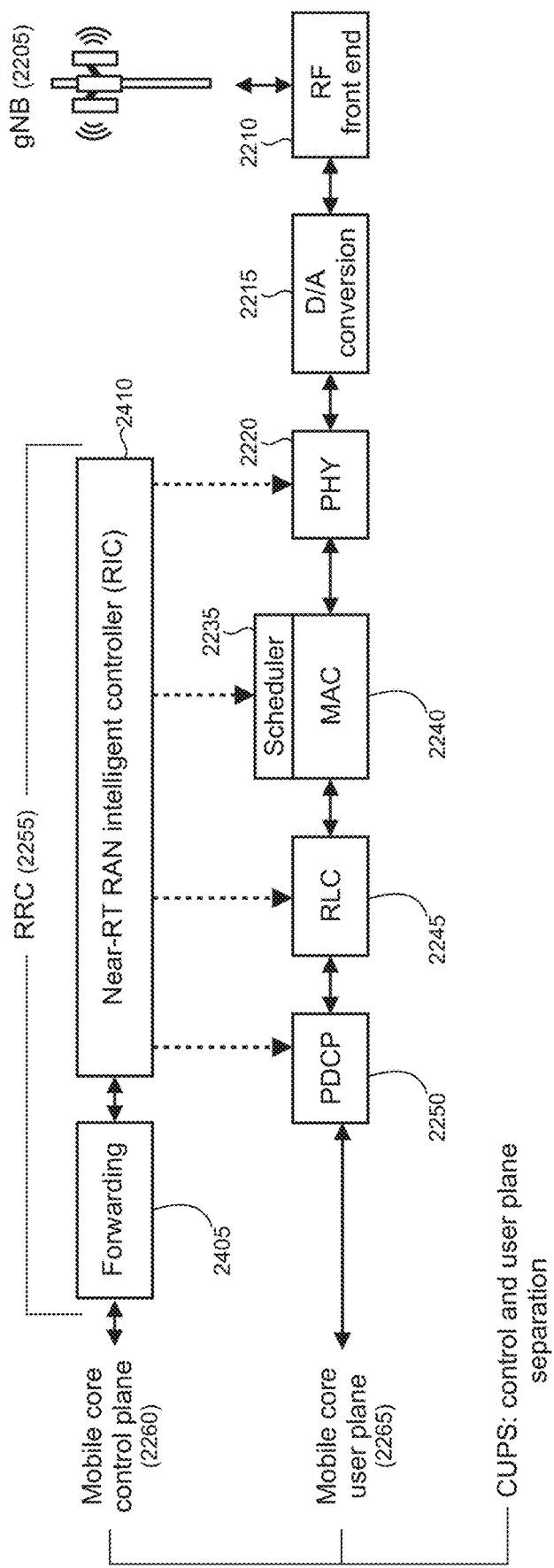
FIG. 24 shows an illustrative radio resource control (RRC) that is disaggregated into a mobile core-facing control plane component and a near-real-time RAN intelligent controller (near-RT RIC)

FIG. 24 shows that the RRC layer component 2255 may be disaggregated into a mobile core-facing control plane forwarding component 2405 and a near-real-time (RT) controller RAN intelligent controller (RIC) 2410. The RRC layer component is thus responsible for only near-real-time configuration and control decision making, while the scheduler 2235 on the MAC component 2240 is responsible for real-time scheduling decisions.

Figure 25:
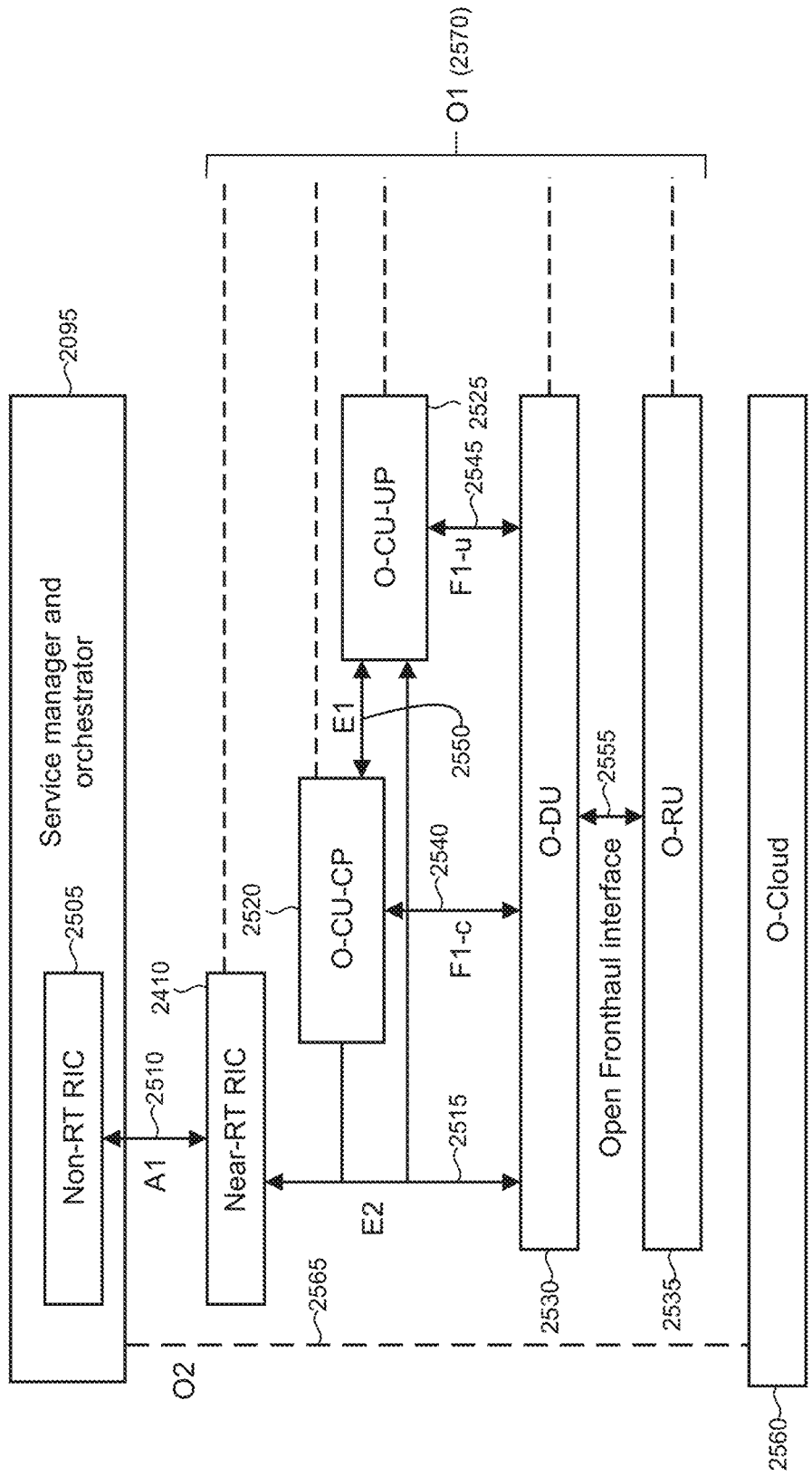
FIG. 25 shows an illustrative RAN operations and maintenance (OAM) logical architecture as described by the O-RAN Alliance.

FIG. 25 shows an illustrative RAN operations and maintenance (OAM) logical architecture 2500, as described by the O-RAN Alliance. In the drawing, the "O" prefix indicates the O-RAN implementation for the functional elements of the architecture. The O-RAN Alliance defines and maintains the A1, E2, O1, O2, and Open Fronthaul interfaces discussed below. As shown, a non-RT RIC 2505 may be incorporated into the service manager and orchestrator 2095. The non-RT RIC interoperates with a near-RT RIC 2410 through an A1 interface 2510.

The near-RT RIC 2410 is coupled over an E2 interface 2515 with network functions for radio access for control and optimization including the O-CU-CP (O-RAN Central Unit-Control Plane) 2520, O-CU-UP (O-RAN Central Unit-User Plane) 2525, and O-DU 2530. The O-CU-CP and O-CU-UP are respectively coupled to the O-DU over F1-c and F1-u interfaces, 2540 and 2545, as defined and maintained by 3GPP. The O-CU-CP is coupled to the O-CU-UP over a 3GPP E1 interface 2550. The O-DU and O-RU 2535 are coupled using an Open Fronthaul interface 2555 (also known as the lower layer split (LLS) interface).

The O-Cloud 2560 is a cloud computing platform comprising a collection of physical infrastructure nodes that meet O-RAN requirements to host the relevant O-RAN functions (i.e., near-RT RIC, O-CU-CP, O-CU-UP, and O-DU), the supporting software components (such as Operating System, Virtual Machine Monitor, Container Runtime, etc.), and the appropriate management and orchestration functions to create virtual network instances and map network functions. The O-Cloud is coupled to the service manager and orchestrator 2095 over the O2 interface 2565. An O1 interface 2570 is provided to each of the near-RT RIC, O-CU-CP, O-CU-UP, O-DU, and O-RU, as shown in FIG. 25.

Figure 26:
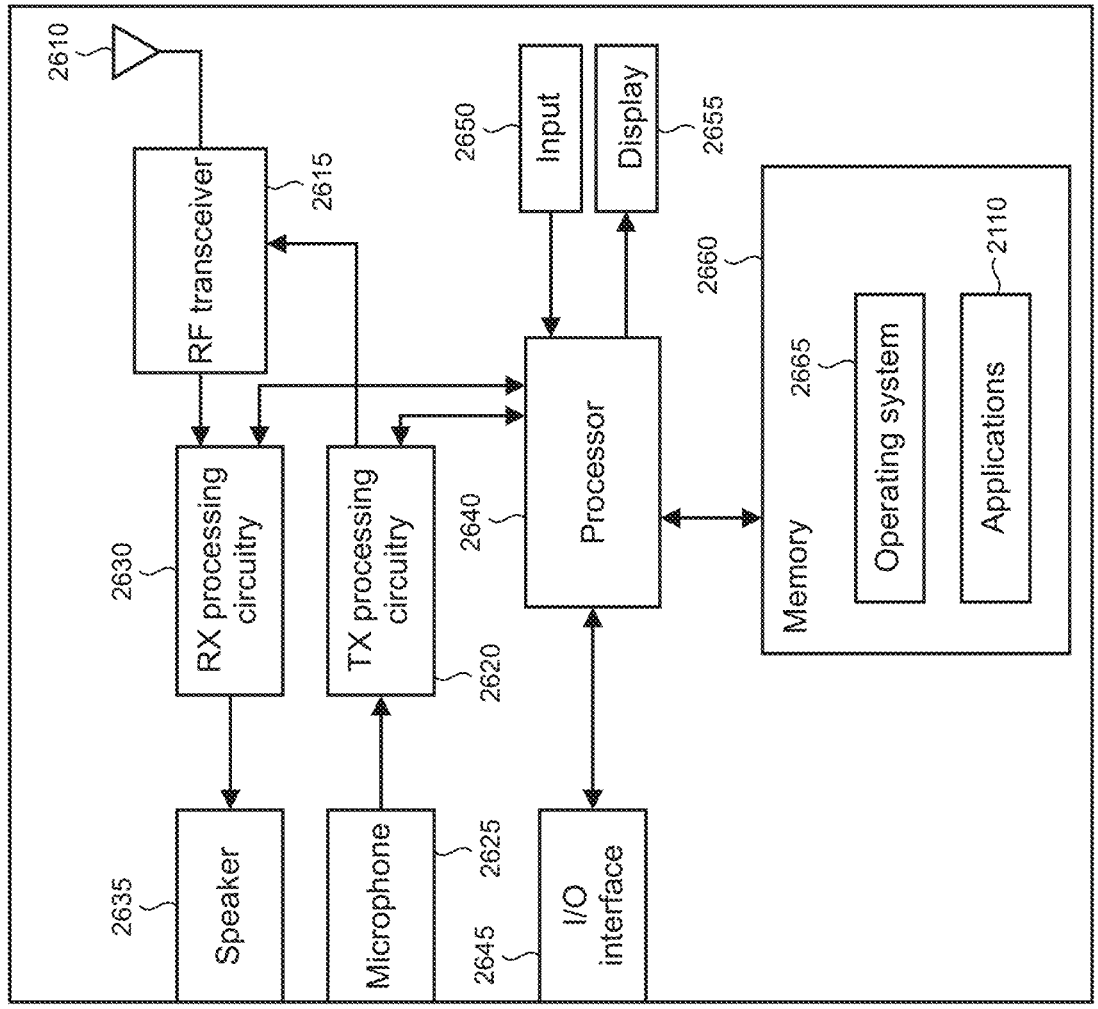
FIG. 26 is a block diagram of an illustrative UE that may be used at least in part to implement the present 5G RAN live migration and sharing.

FIG. 26 is a block diagram of an illustrative UE 1900 that may be used at least in part to implement the present 5G RAN live migration and sharing. The embodiment of the UE 1900 shown in FIG. 26 is for illustration only, and the UEs 1900 shown in the drawings and described in the preceding text may have the same or similar configuration. However, it is noted that UEs may come in a wide variety of configurations, and FIG. 26 does not limit the scope of the present disclosure to any particular implementation of a UE.

The UE 1900 includes an antenna 2610, a radio frequency (RF) transceiver 2615, transmit (TX) processing circuitry 2620, a microphone 2625, and receive (RX) processing circuitry 2630. The UE 1900 also includes a speaker 2635, a processor 2640, an input/output (I/O) interface 2645, an input device 2650, a display 2655, and a memory 2660. The memory includes an operating system (OS) program 2665 and one or more applications 2110.

The RF transceiver 2615 receives from the antenna 2610, an incoming RF signal transmitted by a gNB of a 5G network 2100 (FIG. 21). The RF transceiver down-converts the incoming RF signal to generate an intermediate frequency (IF) or baseband signal. The IF or baseband signal is sent to the RX processing circuitry 2630, which generates a processed baseband signal by filtering, decoding, and/or digitizing the baseband or IF signal. The RX processing circuitry transmits the processed baseband signal to the speaker 2635 (such as for voice data) or to the processor 2640 for further processing (such as for web browsing data).

The TX processing circuitry 2620 receives analog or digital voice data from the microphone 2625 or other outgoing baseband data (such as web data, e-mail, or interactive video game data) from the processor 2640. The TX processing circuitry 2620 encodes, multiplexes, and/or digitizes the outgoing baseband data to generate a processed baseband or IF signal. The RF transceiver 2615 receives the outgoing processed baseband or IF signal from the TX processing circuitry and up-converts the baseband or IF signal to an RF signal that is transmitted via the antenna.

The processor 2640 can include one or more processors or other processing devices and execute the OS program 2665 stored in the memory 2660 to control the overall operation of the UE 1900. For example, the processor may control the reception of forward channel signals and the transmission of reverse channel signals by the RF transceiver 2615, the RX processing circuitry 2630, and the TX processing circuitry 2620 in accordance with well-known principles. In some embodiments, the processor 2640 includes at least one microprocessor or microcontroller.

The processor 2640 may be configured for executing other processes and programs resident in the memory 2660, such as operations for CSI measurement and reporting for systems described in embodiments of the present disclosure. The processor can move data into or out of the memory as required by an executing process. In some embodiments, the processor may be configured to execute the applications 2110 based on the OS program 2665 or in response to signals received from gNBs or an operator. The processor is also coupled to the I/O interface 2645, which provides the UE 1900 with the ability to connect to other computing devices such as laptop computers and handheld computers. The I/O interface may thus function as a communication path between such accessories and the processor.

The processor 2640 is also coupled to the input device 2650 (e.g., keypad, touchscreen, buttons etc.) and the display 2655. A user of the UE 1900 can typically employ the input device to enter data into the UE. For example, the display can be a liquid crystal display or other display capable of rendering text and/or graphics, video, etc., from web sites, applications and/or service providers.

The memory 2660 is coupled to the processor 2640. Part of the memory may include a random access memory (RAM), and another part of the memory may include a Flash memory or other read-only memory (ROM).

As described in more detail below, the UE 1900 can perform signaling and calculation for channel state information (CSI) reporting. Although FIG. 26 shows one illustrative example of UE 1900, it may be appreciated that various changes may be made to the drawing. For example, various components may be combined, further subdivided, or omitted, and additional components may be added according to particular needs. As a particular example, the processor 2640 may be divided into multiple processors, such as one or more central processing units (CPUs) and one or more graphics processing units (GPUS). Also, while FIG. 26 depicts the UE 1900 as configured as a mobile device, such as a smartphone, UEs may be configured to operate as other types of portable or stationary devices.

Figure 27:
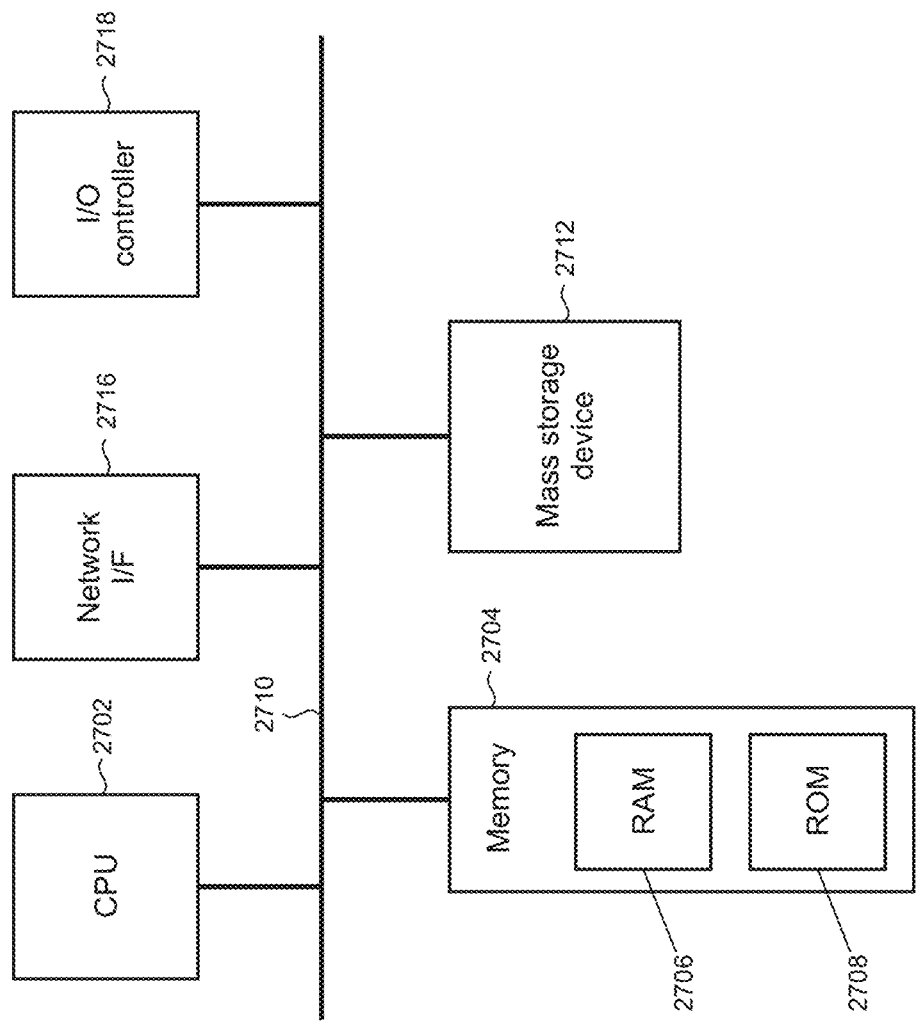
FIG. 27 is a block diagram of an illustrative server or computing device that may be used at least in part to implement the present 5G RAN live migration and sharing.

FIG. 27 shows an illustrative architecture 2700 for a computing device, such as a server, capable of executing the various components described herein for the present 5G RAN live migration and sharing. The architecture 2700 illustrated in FIG. 27 includes one or more processors 2702 (e.g., central processing unit, dedicated AI chip, graphics processing unit, etc.), a system memory 2704, including RAM (random access memory) 2706 and ROM (read only memory) 2708, and a system bus 2710 that operatively and functionally couples the components in the architecture 2700. A basic input/output system containing the basic routines that help to transfer information between elements within the architecture 2700, such as during startup, is typically stored in the ROM 2708. The architecture 2700 further includes a mass storage device 2712 for storing software code or other computer-executed code that is utilized to implement applications, the file system, and the operating system. The mass storage device 2712 is connected to the processor 2702 through a mass storage controller (not shown) connected to the bus 2710. The mass storage device 2712 and its associated computer-readable storage media provide non-volatile storage for the architecture 2700. Although the description of computer-readable storage media contained herein refers to a mass storage device, such as a hard disk or CD-ROM drive, it may be appreciated by those skilled in the art that computer-readable storage media can be any available storage media that can be accessed by the architecture 2700.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2700.

According to various embodiments, the architecture 2700 may operate in a networked environment using logical connections to remote computers through a network. The architecture 2700 may connect to the network through a network interface unit 2716 connected to the bus 2710. It may be appreciated that the network interface unit 2716 also may be utilized to connect to other types of networks and remote computer systems. The architecture 2700 also may include an input/output controller 2718 for receiving and processing input from a number of other devices, including a keyboard, mouse, touchpad, touchscreen, control devices such as buttons and switches or electronic stylus (not shown in FIG. 27). Similarly, the input/output controller 2718 may provide output to a display screen, user interface, a printer, or other type of output device (also not shown in FIG. 27).

It may be appreciated that the software components described herein may, when loaded into the processor 2702 and executed, transform the processor 2702 and the overall architecture 2700 from a general-purpose computing system into a special-purpose computing system customized to facilitate the functionality presented herein. The processor 2702 may be constructed from any number of transistors or other discrete circuit elements, which may individually or collectively assume any number of states. More specifically, the processor 2702 may operate as a finite-state machine, in response to executable instructions contained within the software modules disclosed herein. These computer-executable instructions may transform the processor 2702 by specifying how the processor 2702 transitions between states, thereby transforming the transistors or other discrete hardware elements constituting the processor 2702.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2700 in order to store and execute the software components presented herein. It also may be appreciated that the architecture 2700 may include other types of computing devices, including wearable devices, handheld computers, embedded computer systems, smartphones, PDAs, and other types of computing devices known to those skilled in the art. It is also contemplated that the architecture 2700 may not include all of the components shown in FIG. 27, may include other components that are not explicitly shown in FIG. 27, or may utilize an architecture completely different from that shown in FIG. 27.

Figure 28:
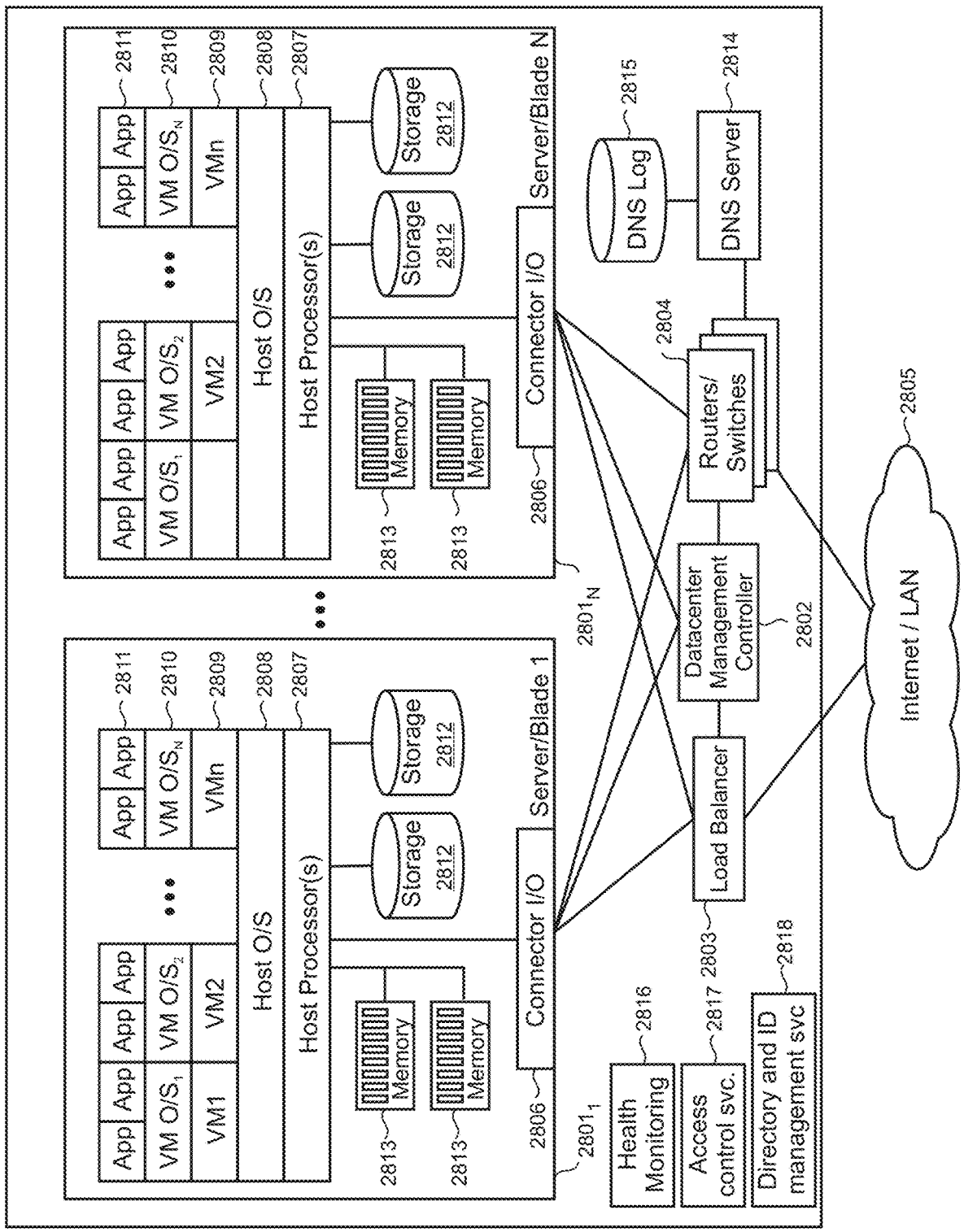
FIG. 28 is a block diagram of an illustrative datacenter that may be used at least in part to implement the present 5G RAN live migration and sharing.

FIG. 28 is a high-level block diagram of an illustrative datacenter 2800 that provides cloud computing services or distributed computing services that may be used to implement the present 5G RAN live migration and sharing. Datacenter 2800 may incorporate one or more of the features disclosed in the DCs shown in the drawings and described in the accompanying text. A plurality of servers 2801 are managed by datacenter management controller 2802. Load balancer 2803 distributes requests and computing workloads over servers 2801 to avoid a situation wherein a single server may become overwhelmed. Load balancer 2803 maximizes available capacity and performance of the resources in datacenter 2800. Routers/switches 2804 support data traffic between servers 2801 and between datacenter 2800 and external resources and users (not shown) via an external network 2805, which may be, for example, a local area network (LAN) or the Internet.

Servers 2801 may be standalone computing devices, and/or they may be configured as individual blades in a rack of one or more server devices. Servers 2801 have an input/output (I/O) connector 2806 that manages communication with other database entities. One or more host processors 2807 on each server 2801 run a host operating system (O/S) 2808 that supports multiple virtual machines (VM) 2809. Each VM 2809 may run its own O/S so that each VM O/S 2810 on a server is different, or the same, or a mix of both. The VM O/Ss 2810 may be, for example, different versions of the same O/S (e.g., different VMs running different current and legacy versions of the Windows® operating system). In addition, or alternatively, the VM O/Ss 2810 may be provided by different manufacturers (e.g., some VMs running the Windows® operating system, while other VMs are running the Linux® operating system). Each VM 2809 may also run one or more applications (App) 2811. Each server 2801 also includes storage 2812 (e.g., hard disk drives (HDD)) and memory 2813 (e.g., RAM) that can be accessed and used by the host processors 2807 and VMs 2809 for storing software code, data, etc. In one embodiment, a VM 2809 may employ the data plane APIs as disclosed herein.

Datacenter 2800 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 2800 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 2809 on server 28011 to run their applications 2811. When demand for an application 2811 increases, the datacenter 2800 may activate additional VMs 2809 on the same server 28011 and/or on a new server 2801N as needed. These additional VMs 2809 can be deactivated if demand for the application later drops.

Datacenter 2800 may offer guaranteed availability, disaster recovery, and back-up services. For example, the datacenter may designate one VM 2809 on server 28011 as the primary location for the tenant's application and may activate a second VM 2809 on the same or a different server as a standby or back-up in case the first VM or server 28011 fails. The datacenter management controller 2802 automatically shifts incoming user requests from the primary VM to the back-up VM without requiring tenant intervention. Although datacenter 2800 is illustrated as a single location, it will be understood that servers 2801 may be distributed to multiple locations across the globe to provide additional redundancy and disaster recovery capabilities. Additionally, datacenter 2800 may be an on-premises, private system that provides services to a single enterprise user or may be a publicly accessible, distributed system that provides services to multiple, unrelated customers and tenants or may be a combination of both.

Domain Name System (DNS) server 2814 resolves domain and host names into IP addresses for all roles, applications, and services in datacenter 2800. DNS log 2815 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 2816 monitors the health of the physical systems, software, and environment in datacenter 2800. Health monitoring 2816 provides feedback to datacenter managers when problems are detected with servers, blades, processors, or applications in datacenter 2800 or when network bandwidth or communications issues arise.

Access control service 2817 determines whether users are allowed to access particular connections and services provided at the datacenter 2800. Directory and identity management service 2818 authenticates user credentials for tenants on datacenter 2800.

Figure 29:
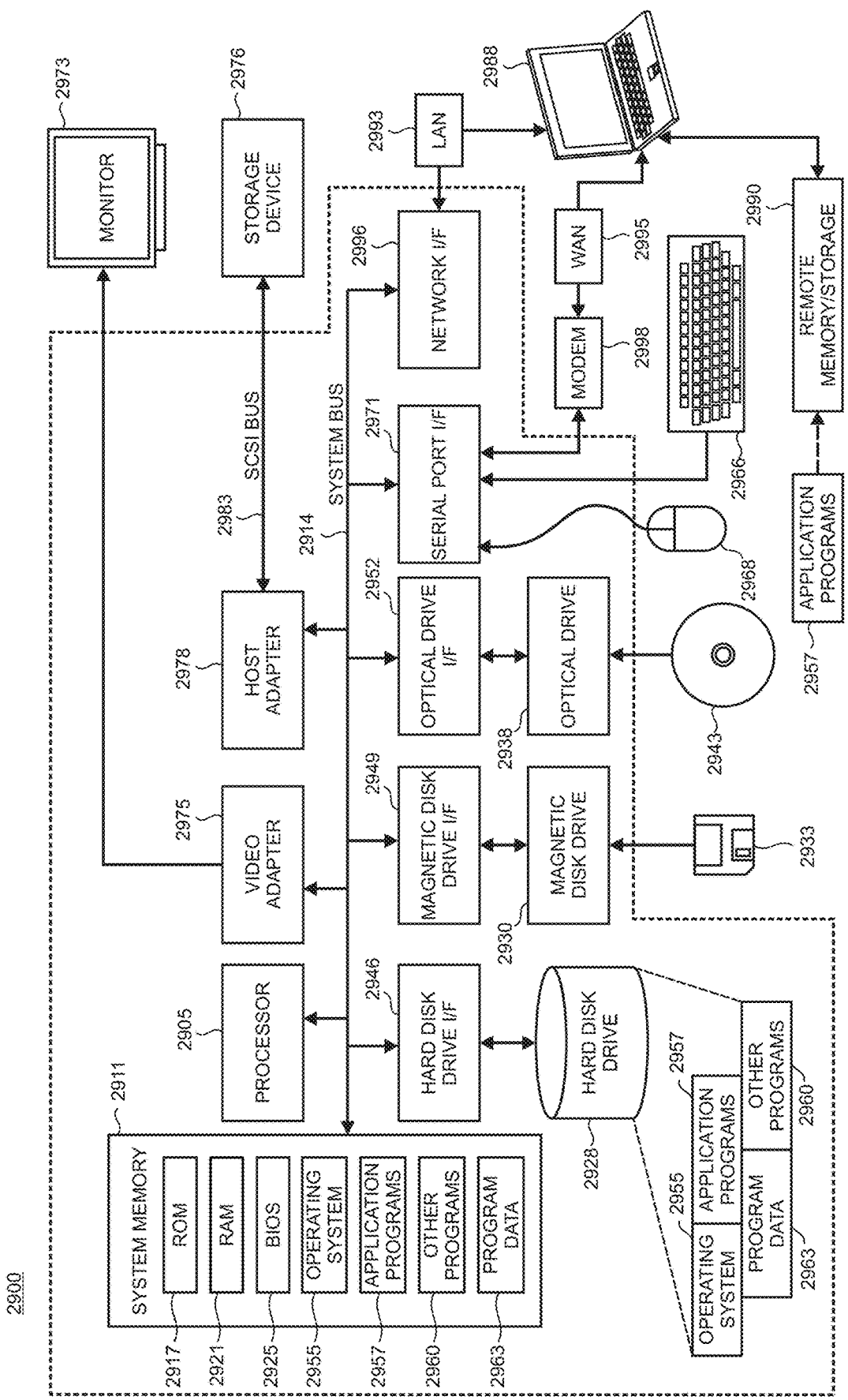
FIG. 29 is a simplified block diagram of an illustrative computer system that may be used at least in part to implement the present 5G RAN live migration and sharing.

FIG. 29 is a simplified block diagram of an illustrative computer system 2900 such as a PC, client machine, or server with which the present 5G RAN live migration and sharing may be implemented. Computer system 2900 includes a processor 2905, a system memory 2911, and a system bus 2914 that couples various system components including the system memory 2911 to the processor 2905. The system bus 2914 may be any of several types of bus structures including a memory bus or memory controller, a peripheral bus, or a local bus using any of a variety of bus architectures. The system memory 2911 includes read only memory (ROM) 2917 and random access memory (RAM) 2921. A basic input/output system (BIOS) 2925, containing the basic routines that help to transfer information between elements within the computer system 2900, such as during startup, is stored in ROM 2917. The computer system 2900 may further include a hard disk drive 2928 for reading from and writing to an internally disposed hard disk (not shown), a magnetic disk drive 2930 for reading from or writing to a removable magnetic disk 2933 (e.g., a floppy disk), and an optical disk drive 2938 for reading from or writing to a removable optical disk 2943 such as a CD (compact disc), DVD (digital versatile disc), or other optical media. The hard disk drive 2928, magnetic disk drive 2930, and optical disk drive 2938 are connected to the system bus 2914 by a hard disk drive interface 2946, a magnetic disk drive interface 2949, and an optical drive interface 2952, respectively. The drives and their associated computer-readable storage media provide non-volatile storage of computer-readable instructions, data structures, program modules, and other data for the computer system 2900. Although this illustrative example includes a hard disk, a removable magnetic disk 2933, and a removable optical disk 2943, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present 5G RAN live migration and sharing. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 2933, optical disk 2943, ROM 2917, or RAM 2921, including an operating system 2955, one or more application programs 2957, other program modules 2960, and program data 2963. A user may enter commands and information into the computer system 2900 through input devices such as a keyboard 2966 and pointing device 2968 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2905 through a serial port interface 2971 that is coupled to the system bus 2914, but may be connected by other interfaces, such as a parallel port, game port, or universal serial bus (USB). A monitor 2973 or other type of display device is also connected to the system bus 2914 via an interface, such as a video adapter 2975. In addition to the monitor 2973, personal computers typically include other peripheral output devices (not shown), such as speakers and printers. The illustrative example shown in FIG. 29 also includes a host adapter 2978, a Small Computer System Interface (SCSI) bus 2983, and an external storage device 2976 connected to the SCSI bus 2983.

The computer system 2900 is operable in a networked environment using logical connections to one or more remote computers, such as a remote computer 2988. The remote computer 2988 may be selected as another personal computer, a server, a router, a network PC, a peer device, or other common network node, and typically includes many or all of the elements described above relative to the computer system 2900, although only a single representative remote memory/storage device 2990 is shown in FIG. 29. The logical connections depicted in FIG. 29 include a local area network (LAN) 2993 and a wide area network (WAN) 2995. Such networking environments are often deployed, for example, in offices, enterprise-wide computer networks, intranets, and the Internet.

When used in a LAN networking environment, the computer system 2900 is connected to the local area network 2993 through a network interface or adapter 2996. When used in a WAN networking environment, the computer system 2900 typically includes a broadband modem 2998, network gateway, or other means for establishing communications over the wide area network 2995, such as the Internet. The broadband modem 2998, which may be internal or external, is connected to the system bus 2914 via a serial port interface 2971. In a networked environment, program modules related to the computer system 2900, or portions thereof, may be stored in the remote memory storage device 2990. It is noted that the network connections shown in FIG. 29 are illustrative and other means of establishing a communications link between the computers may be used depending on the specific requirements of an application of the present 5G RAN live migration and sharing.

Various exemplary embodiments of the present 5G RAN live migration and sharing are now presented by way of illustration and not as an exhaustive list of all embodiments. An example includes a computer-implemented method for radio access network (RAN) live migration, comprising: hosting a virtual source distributed unit (DU) on a first server, the source DU being in communication with traffic from a population of user equipment (UE); hosting a virtual destination distributed unit (DU) on a second server; operating an intelligent controller operable to receive telemetry data describing traffic loading on the source DU and creating fronthaul packet forwarding rules responsive to the telemetry data; operating an IQ (in-phase and quadrature) multiplexer to receive the forwarding rules from the intelligent controller; and using the IQ multiplexer to multiplex IQ samples in fronthaul packets between the source DU and a radio unit (RU) based on the received forwarding rules to hand over the UE traffic from the source DU to the destination DU.

In another example, the telemetry data further describes state of one or more UE in the population. In another example, the forwarding rules are based on cell configuration of each of the source DU and destination DU. In another example, the forwarding rules are based on physical radio resource allocation. In another example, the IQ multiplexer is implemented using one of programmable switch or software switch. In another example, the IQ multiplexer is implemented using software that is instantiated in-line with a virtualized DU or a virtualized central unit (CU). In another example, the forwarding rules implement dynamically modifying slot assignments based on traffic load at the source and destination DUs.

A further example includes one or more hardware-based non-transitory computer-readable memory devices storing computer-executable instructions which, upon execution by one or more processors disposed in a computing device deployed in a 5G (fifth generation) network having a fronthaul between a single radio unit (RU) and a plurality of distributed units (DUs), cause the computing device to: instantiate an intelligent controller for allocating physical radio resources for packets in the fronthaul, the physical radio resources being partitioned in segments comprising respective subcarriers and time slots, in which the subcarriers use dimensions of bandwidth and the time slots use dimensions of time; configure the intelligent controller for receiving telemetry data from the plurality of DUs and generate forwarding rules to implement the radio resource allocation responsive to the telemetry data; and instantiate an IQ (in-phase and quadrature) multiplexer configured for multiplexing IQ samples in the packets responsive to the forwarding rules generated by the intelligent controller so that the plurality of DUs share the single RU according to the allocation.

In another example, the packets comprise xRAN packets. In another example, the intelligent controller is instantiated in a RIC (RAN (radio access network) intelligent controller). In another example, the physical radio resources are partitioned into segments being defined by a numerology, the numerology referring to values of physical transmission parameters defining an air interface between the single RU and user equipment (UE).

A further example includes a radio access network (RAN), comprising: a first distributed unit (DU) in operative communication over a fronthaul network with a radio unit (RU); a second DU in operative communication over a fronthaul network with the RU; an intelligent controller configured with control hooks into the first and second DUs, the intelligent controller configured to receive telemetry data indicating respective loading of data traffic on the first and second DUs and further configured to generate forwarding rules for packets carried on the fronthaul network; and an IQ (in-phase and quadrature) multiplexer configured to receive the forwarding rules from the intelligent controller, the IQ multiplexer further configured to multiplex IQ samples in the packets carried on the fronthaul network to the RU for each of the first and second DUs.

In another example, the RAN is utilized in a fifth generation (5G) mobile network. In another example, the RAN is utilized in a fourth generation long term evolution (4G LTE) mobile network. In another example, the data traffic is carried over an air interface of the RAN between the RAN and user equipment (UE). In another example, the intelligent controller supports at least one network function configured for scheduling physical radio resources for the RAN, the physical radio resources being expressed by subcarrier and time slot. In another example, the intelligent controller and IQ multiplexer operate to implement a single RU and associated RF (radio frequency) spectrum to be shared among a plurality of different DUs. In another example, the intelligent controller and IQ multiplexer operate to hand over UE (user equipment) traffic from the first DU to the second DU. In another example, the RAN is implemented virtually using cloud-computing infrastructure. In another example, the cloud-computing infrastructure comprises one of edge, near-edge, or far-edge cloud-computing platforms.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Appendix: Acronym Table

5G—fifth generation
RAN—radio access network
RF—radio frequency
O-RAN—open RAN
RU—radio unit
DU—distributed unit
CU—central unit
RLC—radio link control
IQ—in-phase and quadrature
UE—user equipment
UL—uplink
DL—downlink
MO—mobile operator
NR—new radio
OAM—operations and maintenance
OFDM—orthogonal frequency division multiplexing
O-RU—open RU
O-DU—open DU
O-CU—open CU
U-Plane—user plane
C-Plane—control plane
ETSI—European Telecommunications Standards Institute
IMT—International Mobile Telecommunications
ITU—International Telecommunications Union
RAT—radio access technology
RT—real-time
RRC—radio resource control
RIC—RAN intelligent controller
PTP—precision time protocol
MIB—master information block
SIB—system information block
PCI—physical cell identifier
HARQ—hybrid automatic repeat request
MIMO—multiple input, multiple output
MORAN—multi-operator radio access network
MOCN—multi-operator core network
PSS—primary synchronization schedule
SSS—secondary synchronization schedule
PBCH—physical broadcast channel
DMRS—demodulation reference signals
PDCCH—physical downlink control channel
PDSCH—physical downlink shared channel
CSI-RS—channel state information reference signal
SSB—synchronization signal block
ASIC—application-specific integrated circuits
TOR—top of rack
PHY—physical
MAC—medium access control
DCI—downlink control information
PT-RS—phase tracking reference signals
FR—frequency range
PRACH—physical random access channel
PUCCH—physical uplink control channel
UCI—uplink control information
PUSCH—physical uplink shared channel
SRS—sounding reference signals
NFV—network function virtualization
SDN—software defined networking
CN—core network
MBB—mobile broadband
URLLC—ultra-reliable and low latency communications
MMTC—massive machine type communications
IoT—internet of things
MIOT—massive internet of things
3D—three-dimensional
UHD—ultra-high-definition
AI—artificial intelligence
QOS—quality of service
SLA—service level agreement
VPN—virtual private network
SST—slice/service type
eMBB—enhanced mobile broadband
V2X—vehicle-to-everything
HMTC—high-performance machine type communications
NSSAI—network slice selection assistance information
SM—session management
SD—slice differentiator
MFH—mobile fronthaul
AR—augmented reality
VR—virtual reality MBH—mobile backhaul
API—application programming interface
DC—datacenter
MEC—multi-access edge computing
D/A—digital to analog
IP—Internet protocol
PDCP—packet data convergence protocol
RRC—radio resource control
CUPS—control and user plane separation
TX—transmit
RX—receive
LAN—local area network
VM—virtual machine
DNS—domain name server
WAN—wide area network

What is claimed:

1. A computer-implemented method for radio access network (RAN) live migration, comprising:
hosting a virtual source distributed unit (DU) on a first server, the source DU being in communication with traffic from a population of user equipment (UE);
hosting a virtual destination distributed unit (DU) on a second server;
operating an intelligent controller operable to receive telemetry data describing traffic loading on the source DU and creating fronthaul packet forwarding rules responsive to the telemetry data;
operating an IQ (in-phase and quadrature) multiplexer to receive the forwarding rules from the intelligent controller; and
using the IQ multiplexer to multiplex IQ samples in fronthaul packets between the source DU and a radio unit (RU) based on the received forwarding rules to hand over the UE traffic from the source DU to the destination DU.

2. The computer-implemented method of claim 1 in which the telemetry data further describes state of one or more UE in the population.

3. The computer-implemented method of claim 1 in which the forwarding rules are based on cell configuration of each of the source DU and destination DU.

4. The computer-implemented method of claim 1 in which the forwarding rules are based on physical radio resource allocation.

5. The computer-implemented method of claim 1 in which the IQ multiplexer is implemented using one of programmable switch or software switch.

6. The computer-implemented method of claim 1 in which the IQ multiplexer is implemented using software that is instantiated in-line with a virtualized DU or a virtualized central unit (CU).

7. The computer-implemented method of claim 1 in which the forwarding rules implement dynamically modifying slot assignments based on traffic load at the source and destination DUs.

8. One or more hardware-based non-transitory computer-readable memory devices storing computer-executable instructions which, upon execution by one or more processors disposed in a computing device deployed in a 5G (fifth generation) network having a fronthaul between a single radio unit (RU) and a plurality of distributed units (DUs), cause the computing device to:
instantiate an intelligent controller for allocating physical radio resources for packets in the fronthaul, the physical radio resources being partitioned in segments comprising respective subcarriers and time slots, in which the subcarriers use dimensions of bandwidth and the time slots use dimensions of time;
configure the intelligent controller for receiving telemetry data from the plurality of DUs and generate forwarding rules to implement the radio resource allocation responsive to the telemetry data; and
instantiate an IQ (in-phase and quadrature) multiplexer configured for multiplexing IQ samples in the packets responsive to the forwarding rules generated by the intelligent controller so that the plurality of DUs share the single RU according to the allocation.

9. The one or more hardware-based non-transitory computer-readable memory devices of claim 8 in which the packets comprise xRAN packets.

10. The one or more hardware-based non-transitory computer-readable memory devices of claim 8 in which the intelligent controller is instantiated in a RIC (RAN (radio access network) intelligent controller).

11. The one or more hardware-based non-transitory computer-readable memory devices of claim 8 in which the physical radio resources are partitioned into segments being defined by a numerology, the numerology referring to values of physical transmission parameters defining an air interface between the single RU and user equipment (UE).

12. A radio access network (RAN), comprising:
a first distributed unit (DU) in operative communication over a fronthaul network with a radio unit (RU);
a second DU in operative communication over a fronthaul network with the RU;
an intelligent controller configured with control hooks into the first and second DUs, the intelligent controller configured to receive telemetry data indicating respective loading of data traffic on the first and second DUs and further configured to generate forwarding rules for packets carried on the fronthaul network; and
an IQ (in-phase and quadrature) multiplexer configured to receive the forwarding rules from the intelligent controller, the IQ multiplexer further configured to multiplex IQ samples in the packets carried on the fronthaul network to the RU for each of the first and second DUs.

13. The RAN of claim 12 as utilized in a fifth generation (5G) mobile network.

14. The RAN of claim 12 as utilized in a fourth generation long term evolution (4G LTE) mobile network.

15. The RAN of claim 12 in which the data traffic is carried over an air interface of the RAN between the RAN and user equipment (UE).

16. The RAN of claim 12 in which the intelligent controller supports at least one network function configured for scheduling physical radio resources for the RAN, the physical radio resources being expressed by subcarrier and time slot.

17. The RAN of claim 12 in which the intelligent controller and IQ multiplexer operate to implement a single RU and associated RF (radio frequency) spectrum to be shared among a plurality of different DUs.

18. The RAN of claim 12 in which the intelligent controller and IQ multiplexer operate to hand over UE (user equipment) traffic from the first DU to the second DU.

19. The RAN of claim 12 as implemented virtually using cloud-computing infrastructure.

20. The RAN of claim 19 in which the cloud-computing infrastructure comprises one of edge, near-edge, or far-edge cloud-computing platforms.

* * * * *